United States Patent
Tsuda et al.

(10) Patent No.: US 6,831,665 B2
(45) Date of Patent: Dec. 14, 2004

(54) CONTROL SYSTEM OF IMAGE PROCESSOR

(75) Inventors: Takao Tsuda, Sayama (JP); Takashi Igarashi, Hino (JP); Hiroyuki Iizuka, Hino (JP); Yasuo Ohkoshi, Sayama (JP); Hideaki Yamamoto, Sayama (JP); Tsuyoshi Ito, Sayama (JP); Sumiya Nagatsuka, Sayama (JP)

(73) Assignee: Konica Corporation (JP)

( * ) Notice: Subject to any disclaimer, the term of this patent is extended or adjusted under 35 U.S.C. 154(b) by 453 days.

(21) Appl. No.: 09/814,140

(22) Filed: Mar. 21, 2001

(65) Prior Publication Data

US 2002/0025172 A1 Feb. 28, 2002

(30) Foreign Application Priority Data

Mar. 21, 2000 (JP) .................................... 2000/078001
Sep. 8, 2000 (JP) .................................... 2000/273061

(51) Int. Cl.⁷ .............................................. G06T 11/00
(52) U.S. Cl. ...................................... 345/740; 345/719
(58) Field of Search ................................ 345/473, 474, 345/475, 714, 719, 740; 396/59, 333, 429; 348/64

(56) References Cited

U.S. PATENT DOCUMENTS 6,272,290 B1 * 8/2001 Mogamiya .................... 396/59

* cited by examiner

Primary Examiner—Almis R. Jankus
(74) Attorney, Agent, or Firm—Cantor Colburn LLP

(57) ABSTRACT

In relation to a control system of an image processor by which transmission and receiving can be conducted with an equipment placed in a store, office, hospital, etc., and with a control apparatus to conduct a maintenance control of the equipment, the maintenance control system of the image processor includes: the image processor; a communication section for transmitting and receiving information between the control apparatus and the image processor; and an information obtaining device for obtaining information to reproduce a condition of the image processor on a control apparatus side, wherein the information obtained by the information obtaining device is transmitted to the control apparatus through the communication section.

54 Claims, 12 Drawing Sheets

CONTROL SYSTEM OF IMAGE PROCESSOR

BACKGROUND OF THE INVENTION

The present invention relates to a control system of an image processor by which transmission and receiving can be conducted with an equipment placed in a store, office, hospital, etc., and with a control apparatus to conduct a maintenance control of the equipment.

Particularly, the present invention relates to a control system of a medical image processor to process a photosensitive medium such as a laser imager, automatic processor, or CR (Computed Radiography).

As an equipment of an image processor, there is also a photo printer to print a photograph from, for example, a negative film onto a printing paper, or a print making apparatus to obtain a print by development processing an exposed film, printing a photograph from the development-processed negative film onto the printing paper, and conducting development processing. However, the image processor referred herein is not limited to so-called a printing apparatus, but includes an image processor to process an image, and combine images, or a means for recording as processing, and an apparatus for recording such as a thermal recording to conduct various image recording, recording of such as inkjet, or recording of such as electrophotography.

In such an equipment, the serviceman conducts the periodic inspection, and when a abnormality occurs in the equipment, the user makes a contact with the serviceman by telephone, and according to the instruction of the serviceman, the user solves the abnormal status by himself.

Further, when the maintenance processing only by the telephone is difficult, the serviceman goes to the place at which the equipment is installed, and solves the abnormal status of the equipment.

In this connection, there is a case where correct processing against abnormality can not be conducted only through the telephone correspondence with the user, or because the serviceman can not obtain the correct information, even when the abnormal status can be solved without the serviceman going to the place, the situation that it is necessary to go to the place, often occurs.

Further, the processing and recording of the medical image in the hospital are important and the strictness is required, and for an image in the office, in color matching or the like, because there is a possibility that the user has the misunderstanding due to the color difference, or it influences on the product image, it is very important to check from the control apparatus whether the correct and adequate processing is conducted in each of image processors. Under the decreasing tendency of the number of the skilled persons, the control of each equipment by using the network is further important.

Further, in a medical image processor to image-wise exposure, or develop onto a photosensitive medium such as an X-ray film or stimulative fluorescent plate, even when the mechanical trouble occurs and operation failure occurs, because the photosensitive medium exists in the apparatus different from electrophotographic type copiers, the user can not simply cope with the trouble by opening the apparatus at once.

For example, when a mechanical trouble occurs in a conveyance path of the photosensitive medium, even though the mechanical trouble position can be generally grasped by a switching sensor provided in the conveyance path, it can not be known that what kind of mechanical trouble occurred, therefore, actually, the service man goes to the installation position, and conducts each kind of inspection by actually moving and opening the apparatus and confirms the content of the mechanical trouble, and copes with the trouble. According to the content of the mechanical trouble which can be confirmed, it is necessary to obtain replacement parts from another place or when the cause of the mechanical trouble can not finally be found, it is necessary that the service man goes back to talk the situation to his office for discussion. However, even when the situation is carried back for discussion, in the judgment in which the cause of the mechanical trouble is the aging deterioration of the parts, mixing-in of the foreign matters, or software trouble, although there is also a case where aging information is necessary, in such the maintenance method, only the information after the failure is obtained, and the problem like as it takes a lot of period of time for research of the cause, also occurs naturally.

Recently, a technology by which the operation log of the image processor is stored as the data in a memory of the apparatus, and service man confirms it at the time of maintenance operation, or the operation log is transmitted through a telecommunication circuit, and the operation condition of the apparatus is grasped at the remote place, is put to practical use. However, by only the operation log of the mechanism or operation log of the software, although it can be grasped that the operation is normal or abnormal, it is a practical situation that there is only a case in which the service man actually goes to the installation position and confirms what mechanical trouble occurs, and what countermeasure is necessary. Further, for the grasp of the peripheral trouble other than the fault portion, it is a practical situation that there is almost no other method but that the service man only goes to the apparatus installation position and searches the trouble.

Further, for example, when the information such as an image, sound, or character can be transmitted and received through the telephone circuit or Internet between the devices installed in a shop, hospital, or factory, particularly the image processing and image recording apparatus (devices) and a control apparatus to conduct the maintenance control of the devices, although the appropriate maintenance instruction can be given from the control apparatus side without making a business trip, it is necessary that the exact information is transmitted and received in a short time and at a low cost.

SUMMARY OF THE INVENTION

The present invention is attained in view of the foregoing problems, and the object of the present invention is to provide a control system of an image processor by which a maintenance operation can be carried out according to the correct information.

In view of such the problems, another object of the present invention is to provide an image processor by which the content of the mechanical trouble in the image processor can be previously grasped and can cope with it at once.

Further, another object of the present invention is to provide a device control system by which the exact information can be transmitted and received in a short time at the low cost, and the maintenance operation can be conducted according to the exact information.

In order to solve the above problems and attain the object, the present invention is structured as follows.

1. A maintenance control system of an image processor having the following structure: the image processor; a communication section for transmitting and receiving the information between a control apparatus and the image processor; and an information obtaining means for obtaining the information to reproduce the condition of the image processor on the control apparatus side, wherein the information obtained by the information obtaining means is transmitted to the control apparatus through the communication section.

2. The maintenance control system according to the item 1, wherein the information is one to reproduce the motion condition of the image processor, and the operation condition to the image processor on the control apparatus side.

3. The maintenance control system according to the item 1, wherein the predetermined information is transmitted in parallel with the maintenance instruction of the control apparatus side.

4. The maintenance control system according to the item 1, wherein the information obtaining means is a photographing means for photographing the operation condition and/or the motion condition of the image processor, and the image information photographed by the photographing means is transmitted to the control apparatus.

5. The maintenance control system according to the item 1, wherein the information obtaining means is a sound recording means for recording the operation sound of the image processor, and the information of the operation sound recorded by the sound recording means is transmitted to the control apparatus.

6. The maintenance control system according to the item 1, wherein the information obtaining means is a smell detection means for detecting the smell at a predetermined position of the image processor, and the smell information detected by the smell detection means is transmitted to the control apparatus.

7. The maintenance control system according to the item 1, wherein the information obtaining means is a vibration detection means for detecting the vibration at a predetermined position of the image processor, and the vibration information detected by the vibration detection means is transmitted to the control apparatus.

8. The maintenance control system according to the item 1, wherein a physical characteristic value change detection means for detecting the change of the physical characteristic value of any one of the heat, light, and pressure is provided, and the change information of the physical characteristic value detected by the physical characteristic value change detection means is transmitted to the control apparatus together with the time information.

9. The maintenance control system according to the item 1, wherein the information obtained by the information obtaining means is transmitted to the control apparatus together with the time information.

10. The maintenance control system according to the item 1, wherein the image processor is an image processor to process the photosensitive medium, and has an image capturing means for capturing the image in the image processor as the image obtaining means in the image processor.

11. The maintenance control system according to the item 1, wherein the image processor is an image processor to process the photosensitive medium, and further has a light source to emit the wavelength outside the photosensitive area of the photosensitive medium, a locus detection means for detecting the locus of the light emission, and a processing means for comparing the locus of the light emission which is a reference when the image processor is normally operated, to the locus of the light emission detected by the locus detection means, and for judging it as abnormal in the case where the locus of the light emission as the reference and the locus of the detected light emission are different from each other, and for storing the judgment information, in the image processor.

12. The maintenance control system according to the item 1, wherein the transmission side stores the transmission data transmitted at the last time, and the receiving side stores at least a portion of the received data received at the last time, and at the next transmission and reception time, the transmission is conducted based on a portion of the last time transmission data.

13. The maintenance control system according to the item 1, wherein the transmission data is transmitted being attached with the data reference value.

14. The maintenance control system according to the item 1, wherein, when transmission is conducted, the transmission side electronically stamps the time stamp on the transmission data.

15. The maintenance control system according to the item 1, wherein, when the data is received, the receiving side electronically stamps the time stamp on the receiving data.

16. The maintenance control system according to the item 1, wherein, when the transmission data itself is the data having the time axis, this time receiving data is recognized when the data is stored including the data just before the last time transmission or receiving data, and this time transmission data or the stored just before receiving data is compared to the stored data.

DETAILED DESCRIPTION OF THE PREFERRED EMBODIMENT

Figure 1:
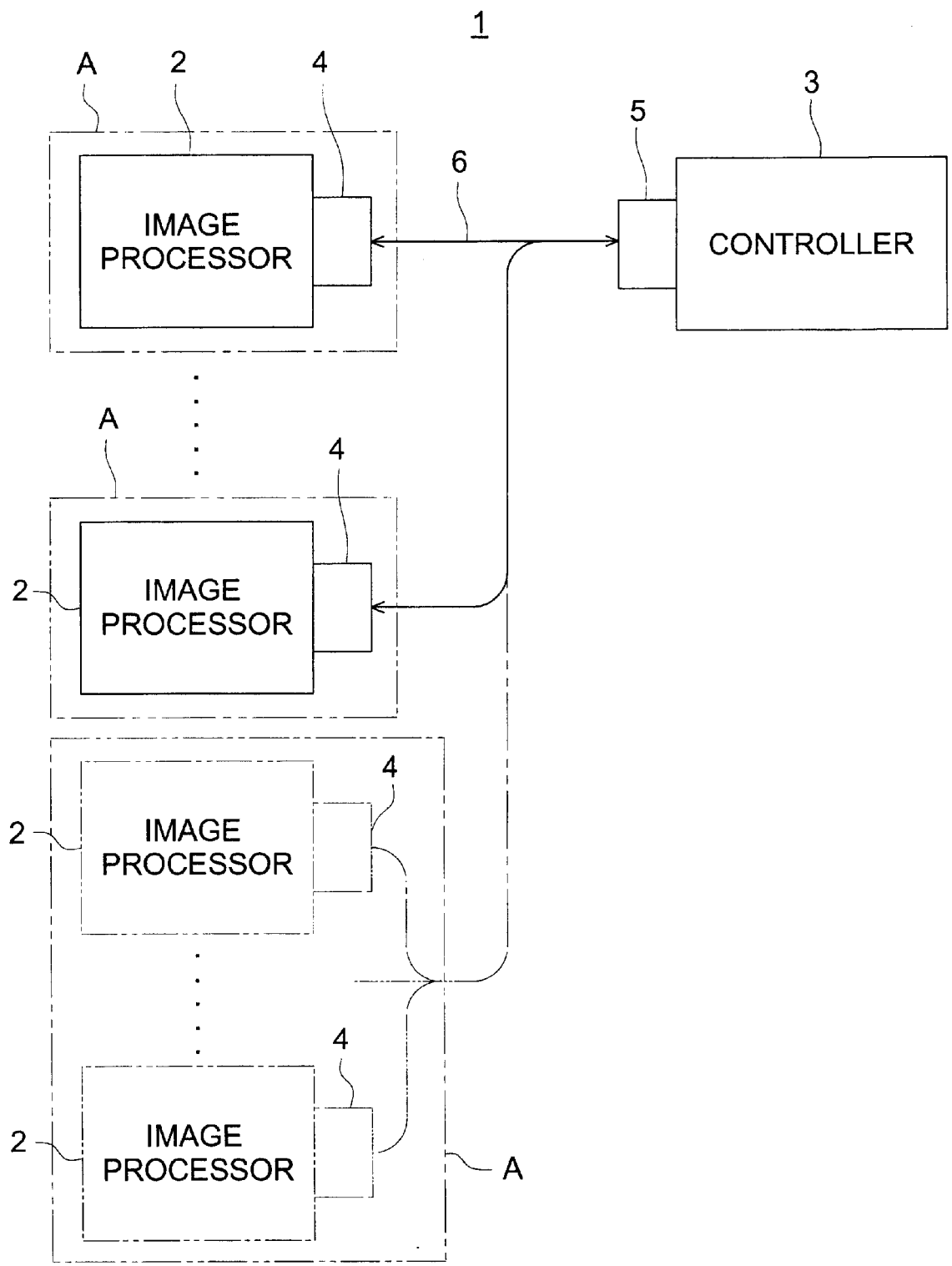
FIG. 1 is an outline structural view of a control system of an image processor.

Referring to the drawings, embodiments of a control system of an image processor of the present invention will be described below. Initially, an apparatus to record an image from a negative film of the photograph onto an printing paper, will be described, however, the present invention is not limited to this embodiment. The control system of the image processor is applied to an apparatus for the image processing or recording, in a shop, office, hospital, or factory.

FIG. 1 is an outline structural view of a control system of image processors. The control system 1 of image processors is structured by image processors 2 arranged in shops A and a control apparatus 3 to conduct the maintenance control of the image processors 2, and the information can be transmitted and received through a communication path 6. A communication device 4 is provided to the image processor 2 and a communication device 5 is provided to the control apparatus 3, and the communication device 4 and the communication device 5 may be integrally assembled in the image processor 2 and the control apparatus 3, or may be separately assembled.

Further, the control apparatus 3 can communicate with each image processor 2 arranged in a plurality of shops A, however, may also be able to communicate with a plurality of image processors 2 arranged in the shop A.

As the image processor 2, there is, for example, a photograph printing machine by which the photograph is printed from a negative film onto a printing paper, or a printing apparatus by which an exposed film is development processed, and from the development processed negative film, the photograph is printed onto the printing paper and development processed and a print is obtained, and in these apparatus, a recording apparatus, image transferring apparatus, or image storing apparatus is included. Further, to the control apparatus 3, a plurality of image processors 2 are connected.

Figure 2:
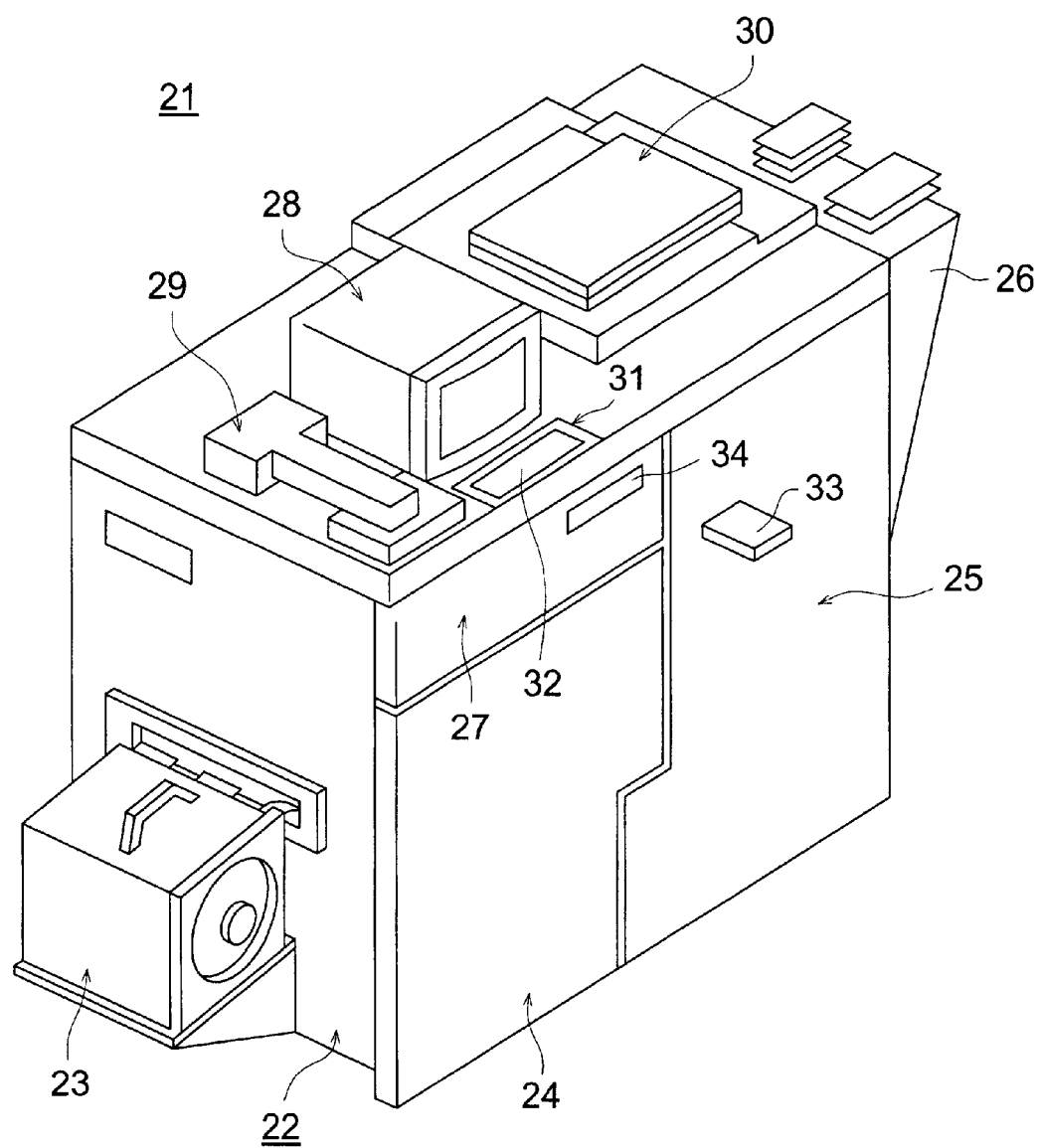
FIG. 2 is a perspective view of a printing apparatus.
Figure 3:
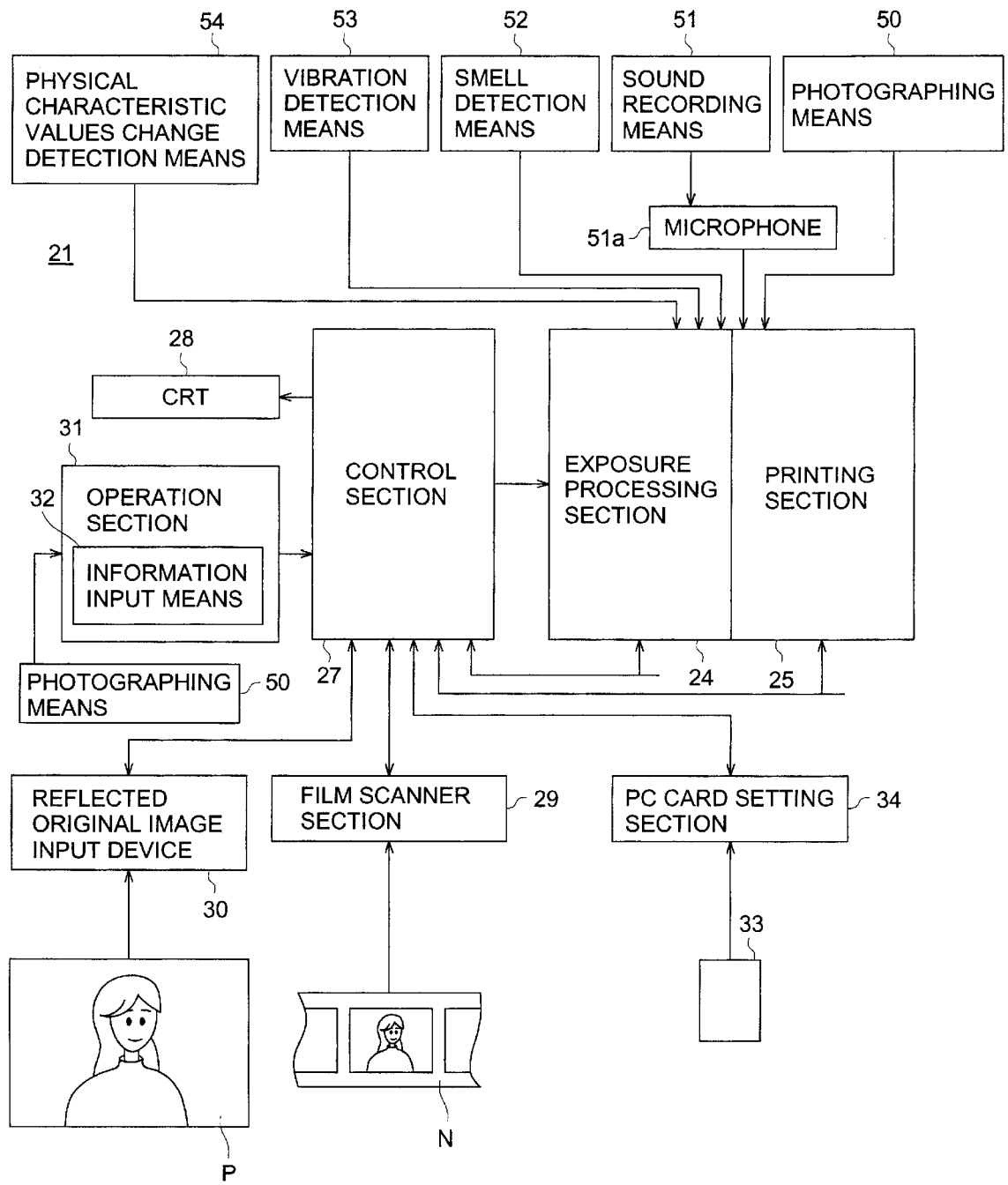
FIG. 3 is an outline structural view of the printing apparatus.

In the present embodiment, as the image processor 2, the printing apparatus is used, and the printing apparatus is shown in FIG. 2 and FIG. 3.

FIG. 2 is a perspective view of the printing apparatus, and FIG. 3 is an outline structural view of the printing apparatus. Herein, as the printing apparatus, an example in which the photosensitive material is exposed and developed, and a print is made, is shown, however, the present invention is not limited to this, but, any apparatus in which a print is made according to the image data, may be allowable, for example, an inkjet type, or electrophotographic type printing apparatus may also be allowed.

A printing apparatus 21 of this embodiment has a magazine loading portion 23 on the left side surface of the apparatus main body 22, and in the apparatus main body 22, an exposure processing section 24 to expose the photosensitive material which is a recording medium, and a printing section 25 to development process the exposed photosensitive material and dry it, and make a print, are provided, and the thus made print is delivered onto a tray 26 provided on the right side surface of the apparatus main body 22. Further, inside the apparatus main body 22, a control section 27 is provided at the upper position of the exposure processing section 24.

Further, at the upper portion of the apparatus main body 22, a CRT 28 is arranged. This CRT 28 structures a display means for displaying the image of the image data to make a print on an image plane. A film scanner section 29 which is a transmission-type original reading apparatus, is arranged on the left side of the CRT 28, and on the right side, a reflected original image input device 30 is arranged.

As an original read from the film scanner section 29 or the reflected original image input device 30, there is a photosensitive material, and as the photosensitive material, a color negative film and color reversal film N are listed. The image data is converted into the digital information by the film scanner of the film scanner section 29, and can be formed to the frame image information. Further, when the photosensitive material is a color paper P, it can be formed to the frame image information by a flat bed scanner of the reflected original image input device 30.

Further, at the position of the control section 27 of the apparatus main body 22, a PC card setting section 34 into which the PC card 33 can be inserted, is provided, and the PC card 33 has a memory in which a plurality of frame image data photographed by a digital camera is stored. The PC card having a memory in which the frame image data is stored, is, for example, a flash ATA card or a compact flash card connected to a PC card adapter, or a smart medium, and structures an image data storage medium.

A operation section 31 is arranged on the front side of the CRT 28, and an information input means 32 is provided in the operation section 31, and the information input means 32 is structured by, for example, a touch panel.

In this connection, the CRT 28, operation section 31, film scanner section 29, reflected original image input device 30, and PC card setting section 34 are integrally provided in the apparatus main body 22, however, any of more than one of them may be provided as the separate apparatus body. In this case, the printing apparatus 21 is treated as a printing system.

A photographing means 50 for photographing the operation condition and motion condition of the image processor 2 is provided in the image processor 2 of the present embodiment. By this photographing means 50, the operation condition of the operation image plane of the operation section 31 is photographed, and the motion condition of the exposure processing section 24 or printing section 25 in the image processor 2 is photographed, and recorded. This photographed image information is transmitted to the control apparatus 3, and the control apparatus can give an adequate maintenance instruction according to the image information in which the operation condition and motion condition of the image processor 2 are photographed.

Further, the photographing means 50 is arranged so that it can photograph a predetermined position of the image processor 2, however, it may be movable. Although the photographic means is not shown in FIG. 2, it is possible that it is arranged at an appropriate position corresponding to the photographic purpose. When it is movable, the operator photographs the position at which it is supposed that the abnormality occurred, and appropriately photographs the operation condition and/or motion condition of the image processor 2, and can transmit it.

As the photographing means 50, for example, a video camera to photograph a moving image or CCD camera is used, and the operation condition and/or motion condition of the image processor 2 can be adequately transmitted to the control apparatus by the image information of the moving image, and the maintenance instruction can be adequately given by the moving image, however, it may be transmitted by using a camera to photograph a still image.

Further, the time axis whose reference is the same as that of the movement of the image processor 2, is displayed in the photographed image, and the abnormality position or the cause of the abnormality can be found from the time at which the abnormality occurs. Further, the photographed image is a monochromatic image or color image, however, the photographing can be made impossible when it is not desired to show the image to the outside for the secret in sales, or to photograph such the portion. The photographed image is renewed for every predetermined time and erased, however, when the abnormality occurs, the images before and after the abnormality are left, and are made to be analyzed.

Further, in the image processor 2 of the present embodiment, a sound recording means 51 to sound-record the motion sound of the image processor 2 is provided. The motion sound is collected by the sound recording means 51 and sound-recorded. This recorded motion sound information is transmitted to the control apparatus 3, and the control apparatus 3 can give the adequate maintenance instruction according to the motion sound information. Because the motion sound is transmitted being recorded together with the occurrence timing data and transmitted, the abnormality portion or the cause of the abnormality can be found from the motion sound and the occurrence time.

Further, the sound recording means 51 has a microphone 51a as a sound collection means, and when the microphone 51a is arranged at each portion of the exposure processing section 24 or printing section 25 of the image processor 2, various motion sounds of the image processor 2 can be obtained, and from these various motion sounds, the abnormality portion or the cause of the abnormality can be found. Although this is not shown in FIG. 2, it is possible that it is arranged at an appropriate position corresponding to the photographic purpose.

The sensitivity to the motion sound can be controlled by the sound of the periphery. The level of the normal sound is defined as the reference, and for example, the level of the gear sound in the image processor 2 is taken as the reference and the abnormal sound can be judged. Ordinarily, the motion sound is renewed for every predetermined time and erased, however, when the abnormality occurs, the sound before and after the abnormal sound is left, and is made to be analyzed.

For the motion sound, it is preferable that the microphone 51a which is a sound collection means provided in each image processor 2, is the same to the control apparatus 3, and the reference sound is regularly generated and the maintenance of performance of the microphone is checked.

For example, the image processor 2 is operated in the standard manner at the beginning of the morning time, and the corresponding sound generation and the content of the previously stored standard sound are compared to each other, and the diagnosis of abnormality can be carried out. Further, a help manual is provided and the sound is generated from the help manual and can be made as a standard sound. Further, the same sound source, and the same sound source as that of the control apparatus 3 are provided so that the sound source is not fluctuated for each image processor 2.

Further, the microphone 51a is arranged so that the direction of the sound source to the microphone 51a is not the same direction, and by arranging a plurality of microphones 51a, the direction of the sound source is specified, and the total arrangement number of the microphone 51a can be decreased.

For the sound source located at a remote position in the frequency, even when the direction of the sound source to the microphone 51a is the same, it may be allowed.

The sound is composed of a plurality of frequencies. As a method to decompose the sound into the frequency components, the FFT (fast Fourier transform) is famous. On the one hand, the machine of the image processor 2 is driven by, for example, rotating the motor at a predetermined speed. When the rotation is constant, the rotation sound is constant. Therefore, the frequency also becomes constant. When the strange sound is generated, because the sound having the different frequency from the ordinary frequency is generated, when the frequency characteristic at the normal motion is stored, the strange sound can be detected from the difference in the frequency. Further, when the sound source direction is specified by the microphone 51a, a plurality of microphones 51a having the directivity are arranged in the different directions, and when the frequency component of each microphone 51a, and the change of time series of the frequency are compared, the intensity of the sound of the certain nature in each microphone 51a can be obtained. When the similarity of the frequency distribution between respective microphones 51a and the intensity are investigated, the direction of the sound source can be specified.

The smell detection means 52 for detecting the smell is provided at a predetermined position of the image processor 2 in the image processor 2 of the present embodiment. By this smell detection means 52, the smell is detected and recorded, and the detected smell information is transmitted to the control apparatus 3. When the smell at a predetermined position of the image processor 2 is detected in this manner, and the smell information is transmitted to the control apparatus 3, the abnormality portion or the cause of the abnormality can be found from the smell information. For example, by the smell detection, the abnormal high temperature can be perceived.

As the smell detection means 52, for example, the smell component adhered onto the surface can be detected by the semiconductor, or the other air element detection means and for example, the smell of the processing solution, the smell of the heater of the thermal development section, or the smell of the dry section, of the printing section 25 can be detected. Although this is not shown in FIG. 2, it is possible that it is arranged at an appropriate position corresponding to the photographic purpose.

Further, a vibration detection means 53 for detecting the vibration is provided at a predetermined position of the image processor 2 in the image processor 2 of the present embodiment. The vibration information detected by the vibration detection means 53 is transmitted to the control apparatus 3. When the vibration at a predetermined position of the image processor 2 is detected as described above, and the detected vibration information is transmitted to the control apparatus together with the time information, the abnormality portion or the cause of the abnormality of the image processor 2 can be found from the vibration information. When the motion standard time is stored together in the image processor 2, when the abnormality occurs, the abnormality portion or the cause of the abnormality can be found. Although this is not shown in FIG. 2, it is possible that it is arranged at an appropriate position corresponding to the photographic purpose.

The vibration detection means 53 detects the vibration of, for example, the conveyance roller of the exposure processing section 24 and the printing section 25, the vibration of the guide plate, vibration of the belt, and vibration of the development section and drying section of the printing section 25. Further, by combining them with the abnormal situation when the image processor 2 receives the vibration by the weak floor out of the guarantee of the floor of the installation portion, the analysis for the investigation of the cause can be easily carried out.

Further, the physical characteristic value change detection means 54 for detecting the change of the physical characteristic value such as the heat, light, and pressure, necessary for the image processing of the image processor 2, is provided in the image processor 2 of the present embodiment. As the heat necessary for the image processing, there is the heat of the drying section, as the light, necessary for the image processing, there is the exposure amount, and as the pressure necessary for the image processing, there is the pressure of the conveyance means for conveying the photosensitive material. The change information of the physical characteristic value detected by the physical characteristic value change detection means 54 is transmitted to the control apparatus 3.

As described above, when the change of the physical characteristic value such as the heat, light, and pressure, necessary for the image processing of the image processor 2, is detected and the change information of the physical characteristic value is transmitted to the control apparatus 3, from the change information of the physical characteristic value, the abnormality portion of the image processor 2 or the cause of the abnormality can be found. The physical characteristic value change detection means 54 detects the change of the physical characteristic value such as the heat, light, and pressure, necessary for the image processing of the image processor 2, and thereby, from the relationship of the change information with the abnormality occurrence timing, in the same manner as the sound, the investigation of the cause can be easily carried out.

In the control apparatus 3 in which the change information of the physical characteristic value is received, the entrance time information of the change information of the physical characteristic value is stored in the apparatus 3, together with the change information, and thereby, the correct and adequate processing can be carried out. Further, in the control apparatus 3 in which the abnormality information is received, the entrance time information of the abnormality information is stored together with the change information, and the correct and adequate processing can be carried out.

Figure 4:
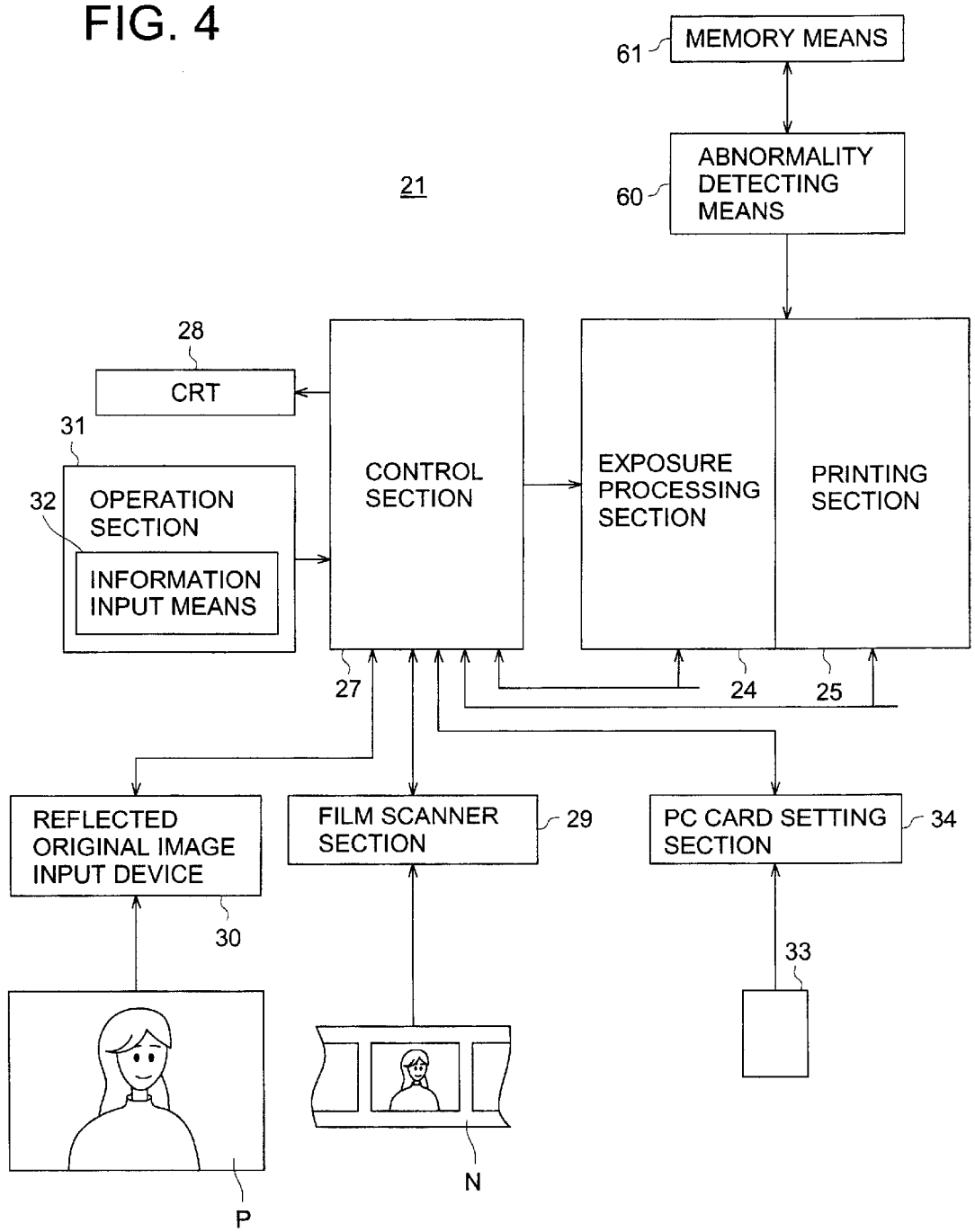
FIG. 4 is an outline structural view of another embodiment of the printing apparatus.

FIG. 4 is an outline structural view of the another embodiment of the printing apparatus.

The abnormality detection means 60 for detecting the abnormal situation of the image processor is provided in the image processor 2 of the present embodiment. The abnormality information detected by the abnormality detection means 60 is transmitted to the control apparatus 3, and the control apparatus 3 can give the adequate maintenance instruction according to the abnormality information.

The abnormality detection means 60 can be structured by: the photographing means 50 for photographing the motion condition of the image processor 2 shown in FIG. 3; sound recording means 51 for sound-recording the motion sound of the image processor 2; smell detection means 52 for detecting the smell provided at a predetermined position of the image processor 2; vibration detection means 53 for detecting the vibration provided at a predetermined position of the image processor 2; and physical characteristic value change detection means 54 for detecting the change of the physical characteristic value such as the heat, light and pressure, necessary for the image processing of the image processor 2.

The image information of the abnormal motion is transmitted from the photographing means 50, and the control apparatus 3 can give the adequate maintenance instruction according to the image information of the abnormal motion. The abnormal motion sound information is transmitted from the sound recording means 51, and the control apparatus 3 can give the adequate maintenance instruction according to the abnormal motion sound information. The abnormal smell information is transmitted from the smell detection means 52, and the control apparatus 3 can give the adequate maintenance instruction according to the abnormal smell information. The abnormal vibration information is transmitted from the vibration detection means 53, and the control apparatus 3 can give the adequate maintenance instruction according to the abnormal vibration information. The change information of the abnormal physical characteristic value is transmitted from the physical characteristic value change detection means 54, and the control apparatus 3 can give the adequate maintenance instruction according to the change information of the abnormal physical characteristic value.

When the abnormality occurs, the abnormality detecting means 60 integrally records the output from the detecting means for the visual sense, acoustic sense, or olfaction, the abnormality occurrence time and the time before and after the abnormality occurrence time, together with the abnormality occurrence content in the storage means 61. As the abnormality occurrence content, for example, the phenomena during the processing, and the time in the printing section 25 are integrally recorded and stored with the number of the image which is being recorded.

When the abnormality occurrence time of the image processor 2 and the time before and after the abnormality occurrence time are integrally recorded with the abnormality occurrence content, the more adequate maintenance instruction can be given according to the abnormality information.

The data of the normal condition of the image processor 2 is stored, and for every predetermined time, the data of a series of motion condition is obtained, and compared with the standard data, and the abnormality is detected according to the difference more than a predetermined value. In this manner, the data of the motion condition of the image processor 2 is compared with the standard data, and the abnormality can be simply and surely detected according to the difference more than a predetermined value, and the more adequate maintenance instruction can be given according to the abnormality information.

Further, for example, a speaker is provided in the image processor 2, and the operator can be made to hear the generation sound of the standard condition.

Further, the data of the standard sound or the standard vibration can be changed corresponding to the change of the unit replacement or apparatus replacement software. After the unit replacement or apparatus replacement software is changed and the sequence is changed, or after the cleaning or maintenance, a series of motion is conducted, and the information data of the sound or vibration is recorded, and this data is held in common in the image processor 2 and the control apparatus 3, and the abnormality detection is conducted.

The single body in the image processor 2 is made enable to be driven, and the standard sound is generated by using the human ears by which the generation sound can be compared with the standard sound or vibration, and it can also be compared with the sound of the actual machine, thereby, the abnormality detection is conducted.

Further, in the image processor 2 into which the information corresponding to the change information of the physical characteristic value is entered from the control apparatus 3, at least one of the transmission content, transmission date and time, transmission person, and transmission destination of the corresponding information transmitted from the control apparatus is stored, thereby, it can be checked whether the correct and adequate processing is conducted in each image processor 2.

Further, in the image processor 2 into which the information corresponding to the abnormality information is entered from the control apparatus 3, at least one of the transmission content, transmission date and time, transmission person, and transmission destination of the corresponding information transmitted from the control apparatus is stored, thereby, it can be checked whether the correct and adequate processing is conducted in each image processor 2.

Further, the processing and recording of the medical image in the hospital are important and the strictness is required, and also for an image in the office, in color matching or the like, because there is a possibility that the user has the misunderstanding due to the color difference, or it influences on the product image, it is very important to check from the control apparatus whether the correct and adequate processing is conducted in each of image processors. Under the decreasing tendency of the number of the skilled persons, the control of each equipment by using the network is further important.

As described above, the operation condition and the motion condition of the image processor can be exactly reproduced in the system of the embodiment 1.

Further, because the image information in which the operation condition and/or motion condition of the image processor are photographed, is transmitted to the control apparatus, the control apparatus can give an adequate maintenance instruction according to the correct information.

Further, the photographing means is moved, and the operation condition and/or motion condition of the image processor can be adequately photographed, and can be transmitted.

Further, because the photographed image is an animation, and the operation condition and/or motion condition of the image processor can be adequately transmitted to the control apparatus, the maintenance instruction can be adequately given according to the animation.

Further, a time axis whose reference is the same as that of the movement of the image processor, is displayed in the photographed image, and from the time at which the abnormality occurs, the abnormality position or the cause of the abnormality can be known.

Further, the motion sound information in which the motion sound of the image processor is sound-recorded, is transmitted to the control apparatus, and the control apparatus can give an adequate maintenance instruction according to the motion sound information.

Further, because the motion sound is sound-recorded together with the occurrence time timing data and transmitted, from the motion sound and its occurrence time, the abnormality position or the cause of the abnormality can be found.

Further, by arranging the microphone of the sound recording means at each position of the image processor, various motion sounds of the image processor are obtained, and the abnormality portion or the cause of the abnormality can be found.

Further, because the time axis whose reference is the same as that of the movement of the image processor, is sound-recorded, from the time at which the abnormality occurred, the abnormality portion or the cause of the abnormality can be found.

Further, the smell at a predetermined position of the image processor is detected, and by transmitting the smell information to the control apparatus, from the smell information, the abnormality portion or the cause of the abnormality of the image processor can be found.

Further, the vibration at a predetermined position of the image processor is detected, and by transmitting the vibration information to the control apparatus, from the vibration information, the abnormality portion or the cause of the abnormality of the image processor can be found.

Further, by transmitting the vibration information to the control apparatus together with the time axis whose reference is the same as that of the movement of the image processor, from the time of occurrence of the vibration, the abnormality portion or the cause of the abnormality can be found on the control apparatus.

Further, by detecting the change of the physical characteristic value such as the heat, light, and pressure, necessary for the image processing of the image processor, and by transmitting the change information of the physical characteristic value together with the time information to the control apparatus, from the change information of the physical characteristic value, the abnormality portion or the cause of the abnormality of the image processor can be found.

Further, by storing the using standard time together in the image processor, when the abnormality occurs, the abnormality portion or the cause of the abnormality can be found.

Further, because the abnormal condition of the image processor is detected and the detected abnormality information is transmitted to the control apparatus, the control apparatus can give the adequate maintenance instruction according to the abnormality information.

Further, the more adequate maintenance instruction can be given according to the abnormality information by integrally recording the abnormality occurrence time and the time before and after the abnormality occurrence time in the storage means with the abnormality occurrence content.

Further, because the data of the condition of the motion of the image processor is compared with the standard data, and according to the difference more than a predetermined value, the abnormality can be simply and surely detected, the more adequate maintenance instruction can be given according to the abnormality information.

Further, because the image information of the abnormal motion is transmitted, the control apparatus can give the adequate maintenance instruction according to the image information of the abnormal motion.

Further, because the abnormal motion sound information is transmitted, the control apparatus can give the adequate maintenance instruction according to the abnormal motion sound information.

Further, because the abnormal smell information is transmitted, the control apparatus can give the adequate maintenance instruction according to the abnormal smell information.

Further, because the abnormal vibration information is transmitted, the control apparatus can give the adequate maintenance instruction according to the abnormal vibration information.

Further, because the change of the physical characteristic value such as the heat, light, and pressure, necessary for the image processing of the image processor, is detected and transmitted, the control apparatus can give the adequate maintenance instruction according to the change information of the abnormal physical characteristic value.

Further, the control apparatus which receives the change information of the physical characteristic value, can conduct the correct and adequate processing by storing the entrance time information of the change information of the physical characteristic value together with the change information.

Further, the control apparatus which receives the abnormality information, can conduct the correct and adequate processing, by storing the entrance time information of the abnormality information together with it.

Further, when at least one of the transmission content, transmission date and time, transmission person, and transmission destination of the corresponding information transmitted from the control apparatus, is stored in the image processor into which the information corresponding to the change information of the physical characteristic value is entered from the control apparatus, it can be checked whether the correct and adequate processing is conducted in each of image processors.

Further, when at least one of the transmission content, transmission date and time, transmission person, and transmission destination of the corresponding information transmitted from the control apparatus, is stored in the image processor into which the information corresponding to the abnormality information is entered from the control apparatus, it can be checked whether the correct and adequate processing is conducted in each of image processors.

(Embodiment 2 of the Invention)

Although, referring to the drawings, the embodiment 2 of the present invention will be described below, the present invention is not limited to this.

Figure 5:
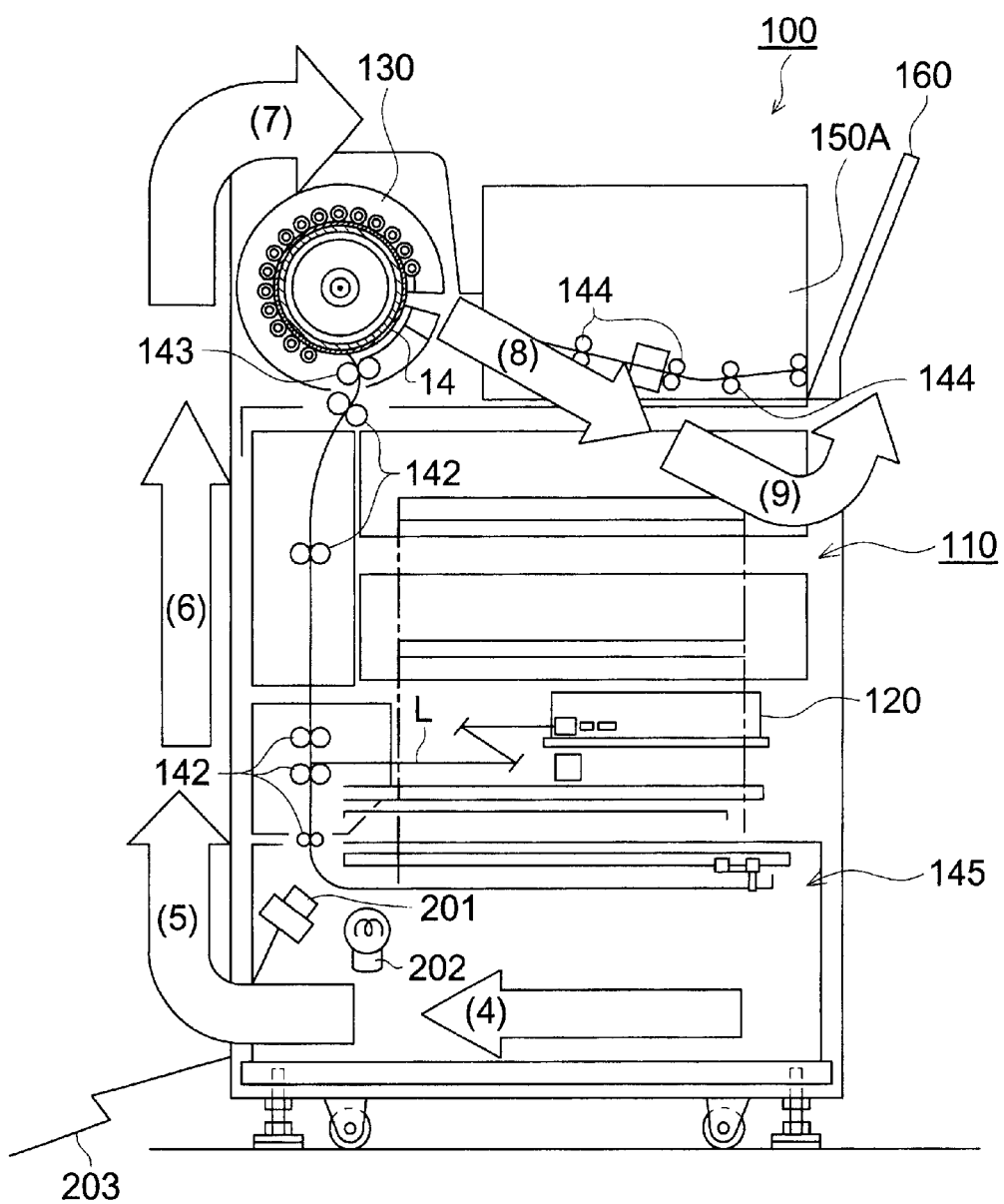
FIG. 5 is a front view of a thermal development apparatus to conduct the thermal development on the silver halide photographic photosensitive thermal development material, as an example of the image processor of the present invention.
Figure 6:
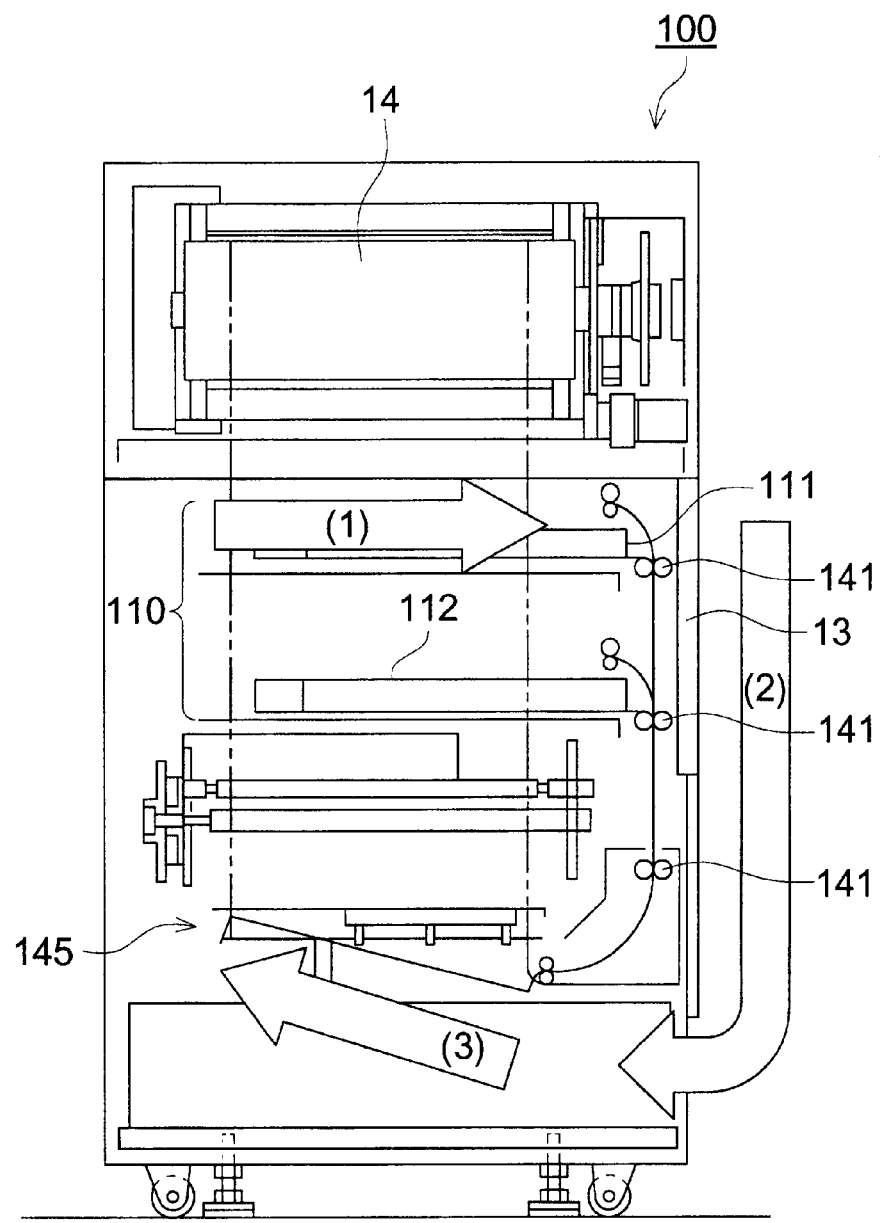
FIG. 6 is a left side view of the thermal development apparatus of FIG. 5.

FIG. 5 is a front view of the thermal development apparatus which exposes the silver halide photographic photosensitive thermal development material and the thermally develops it, as an example of the image processor of the present invention, and FIG. 6 is a left side view of the thermal development apparatus. As the image processor of the present invention, it is preferable that the processor is applied for medical devices such as, other than that, an X-ray photographing apparatus which takes-in the photosensitive medium in the apparatus and processes it, a wet type Roentgen film development processor, or CR (Computed Radiography).

A thermal development apparatus 100 is an apparatus to conduct the thermal development on the film which is the sheet-like silver halide photographic photosensitive thermal development material, and has a feed section 110 to feed the film one sheet by one sheet from a film accumulation body, an exposure section 120 to expose the fed film, and a development section 130 to thermally develop the exposed film. Referring to FIG. 5 and FIG. 6, the thermal development apparatus 100 will be described below.

In FIG. 6, in the feed section 110, trays 111 and 112 to accommodate the film are provided in the upper and lower 2 stages. The feed section 110 is a pick-up roller (not shown) and takes out the film from the trays 111 and 112 one sheet by one sheet, and pulls out in the direction (horizontal direction) shown by an arrow (1) in the drawing. Further, a conveyance roller pair 141 conveys the film pulled out from the trays 111 and 112 in the direction (downward) shown by an arrow (2) in the drawing.

The film conveyed to the lower side of the thermal development apparatus 100 is further conveyed to a conveyance direction conversion section 145 provided on the lower side of the thermal development apparatus 100, and the conveyance direction of the film is converted by the conveyance direction conversion section 145 (in the arrowed direction (3) in FIG. 6 and the arrowed direction (4) in FIG. 5) and entered into the exposure preparing stage. Further, a conveyance apparatus 142 conveys the film from the left side surface of the thermal development apparatus 100 to the direction (upward) shown by the arrow (5) in FIG. 5, and at the time, the exposure section 120 irradiates the laser light L in the range of the infrared area 780 to 860 nm, for example, the laser light of 810 nm, onto the film.

The exposure section 120 causes the laser light L which is intensity-modulated according to the image signal, to deflect and to main-scan on the film, and to sub-scan the film by relatively moving the film to the almost right angle direction to the main scanning direction of the laser light L, and to form the latent image on the film.

After that, a paired supply roller 143 conveys the film in the direction (upward) shown by the arrow (6) in FIG. 5, and supplies it to a drum 14. That is, the film is supplied at a random timing.

Further, the paired supply roller 143 may stop until the next supplied position on the periphery of the drum 14 reaches a predetermined rotation position, and may also be rotated when the next supplied position on the periphery of the drum 14 reaches a predetermined rotation position. That is, by controlling the rotation of the paired supply roller 143, the film may also be supplied to a predetermined supplied position of the drum 14.

The drum 14 is rotated together in the direction shown by an arrow (7) in FIG. 5 in the condition that the film and the outer periphery of the drum 14 are closely contacted with each other. In such the condition, the drum 14 heats and thermally develops the film. That is, the latent image on the film is formed as a visual image. After that, when the drum 14 in FIG. 5 is rotated to the right direction, the film is separated from the drum 14 and cooled while being conveyed in the direction shown by an arrow (8) in FIG. 5. After that, a conveyance apparatus 144 conveys the film separated from the drum 14 in the direction shown by an arrow (9) in FIG. 5, and delivers it onto a delivery tray 160 so that the film can be taken from the upper portion of a thermal development apparatus 100.

Herein, in the image processor of the present invention, a CCD camera 201 which can photograph the conveyance path (portions shown by the arrows (5) and (6) in FIG. 5) structured by the conveyance apparatus 142 of the thermal development apparatus 100, and a light source 202 are arranged as an image capturing means in the left lower portion in FIG. 5. Further, the image data taken in by the CCD camera 201 can be transmitted through a telecommunication circuit 203 as the transmission means.

Although the CCD camera 201 is used herein, when it is a kind of an area sensor by which an image of a degree in which the mechanical trouble in the apparatus can be visually discriminated, can be taken in, it is not limited to this, but a CMOS camera or photodiode array can be used. The image data taken in by the CCD camera 201 is temporarily stored in a memory provided in the apparatus, and may be transmitted to the service station for the object of the remote maintenance though the telecommunication circuit 203 such as a telephone circuit, or may be accumulated in the memory in the apparatus so that the service man can confirm at the time of the maintenance of the apparatus. Further, in the purpose of accumulating the image data, the image in the apparatus may be printed out onto the silver halide film by using the still camera, and developed and discriminated.

As a light source 202, when it is a light source which can emit the light having the wavelength by which the photosensitive medium is not exposed to the light, it is not particularly limited, but a lamp (tungsten lamp, fluorescent lamp), LED, and laser can be used, and a filter of the wavelength to be cut is attached to it at need. In the present embodiment, because the sensitivity of the film is in the infrared area, the LED having the wavelength of about 400 nm can be preferably used.

The capturing operation of the image of a CCD camera 201 which is the image capturing means, and the light source 202 may be conducted at a predetermined date and time or at every fixed time, for confirming the mechanical trouble in the apparatus or judging the aging deterioration, or may be appropriately conducted when it is judged that the mechanical trouble occurs by the detection by the jam sensor. Further, it is also a preferable mode that the capturing operations of the image is conducted at the necessary time by the remote control from the outside of the apparatus or the remote place such as the service station through the telecommunication circuit 203. Of course, at every fixed time, at a predetermined set date and time, or at a time of the occurrence of mechanical trouble, the capturing of the image by the remote control may also be used in the combination. When it is conducted for every fixed time, because the minute change due to the elapsed time of the machine in the apparatus can be inspected, the specifying of the mechanical trouble can be easily conducted, and further, the replacement time of the parts to be replaced can also be adequately grasped.

Herein, a specific example of the capturing timing of the image by the image capturing means such as the CCD camera 201, and the judgment operation from the image obtained by the image capturing means will be described below.

(The Capturing Timing of the Image)

1. Capturing of the Image by the Outer Trigger.

By utilizing the telecommunication circuit, the capturing operation of the image (the shutter is opened) is conducted by the image capturing means such as the CCD camera 201 at a desired timing from the remote place such as the service station, or the image capturing means is caused to conduct the capturing operation of the image by a controller provided in the image processor.

2. Capturing of the Image at the Time of Occurrence of the Error.

When it is recognized that the error occurs, by a sensor provided in the image processor, the image capturing operation is conducted. The image capturing means to conduct the image capturing operation at the time sets a flag from the CPU to recognize the occurrence of error into the CPU to control the image capturing operation, and may cause the operation to interlock with each other (when the CPU to control the capturing operation of the image and the CPU to recognize the occurrence of error are the same, the image capturing operation is included in the error processing), or may cause all of image capturing means to conduct the image capturing operation when the error occurs, without any relationship with the kind of the mechanical, electrical, or software error.

3. Capturing of the Image at Every Fixed Time.

The capturing operation by the image capturing means is conducted one time per one day, for example, during the initial operation of the start up of the image processor.

(Judgment Method)

Calculation is conducted by the CPU, and the judgment operation is conducted (other than the CPU, a dedicated IC may be produced).

Initially, the judgement method by comparing a plurality of pixels with each other will be described below.

1. Previously, an image A as the reference image is taken in by the image capturing means, and stored in the memory. The image A is, for example, an image when the image processor is the new one.

2. An image B as the comparison image is taken in by the image capturing means, and stored in the memory. The image B is an image obtained at the image capturing timing.

3. Each of pixels of the image A and the image B is compared with each other, and the judgement is conducted according to the difference.

Figure 7:
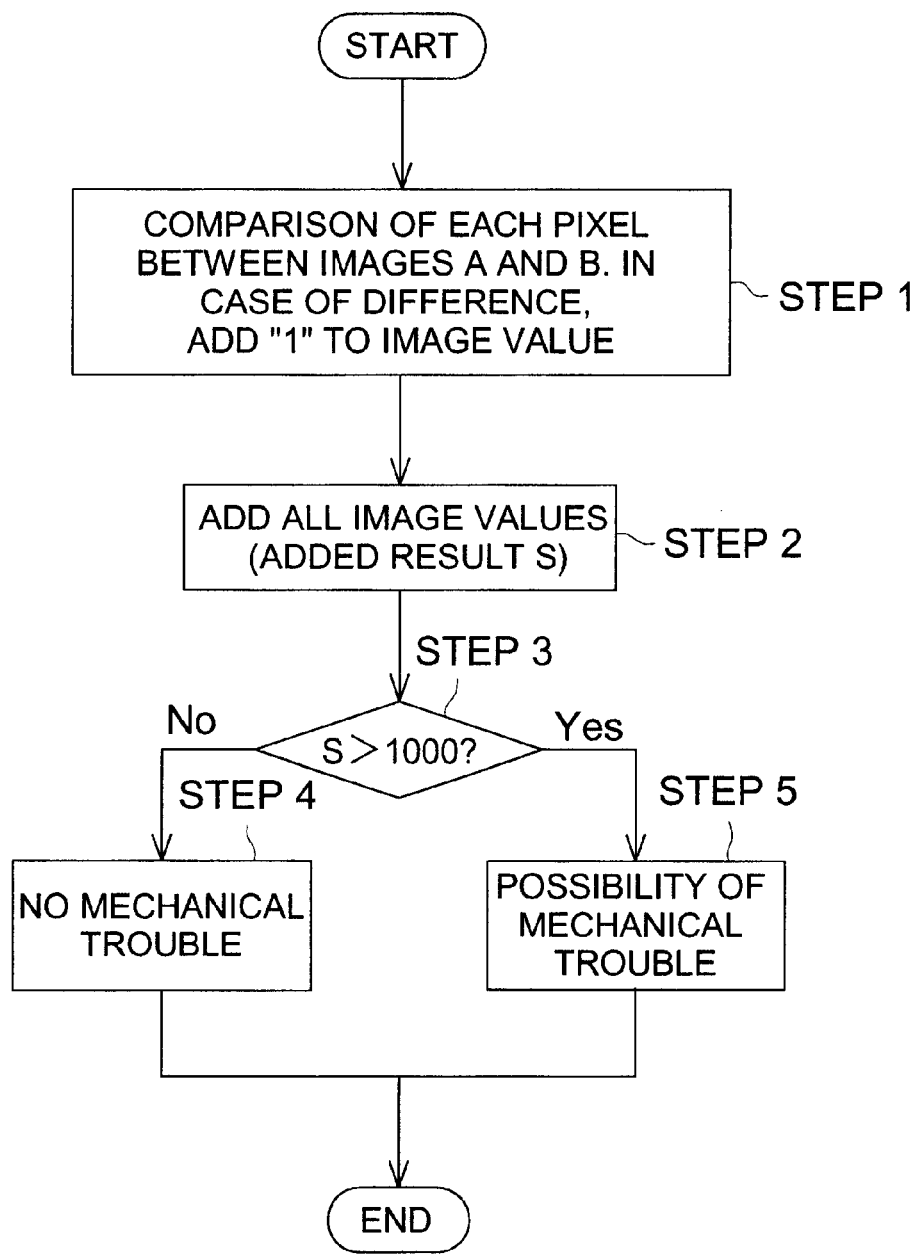
FIG. 7 is a flow chart showing an example of a judgment method of the mechanical trouble in the image processor.

A specific example of the judgement method to compare pixels with each other, is shown in a flow chart in FIG. 7. Initially, an arbitrary pixel in pixels constituting the image A is compared with a pixel corresponding to the image B, and when both pixels are different from each other, 1 is added (Step 1).

The same processing is conducted on all pixels (Step 2). In this case, the addition result is defined as S. When there is no change by the mechanical trouble in the image processor, theoretically S=0.

Next, it is judged whether the addition result S exceeds a previously set threshold value (for example, 1000) (Step 3). When it does not exceed the threshold value (No), it is judged that there is no mechanical trouble (normal operation) (Step 4). When it exceeds the threshold value (Yes), it is judged that there is a possibility of mechanical trouble (abnormal operation) (Step 5), and any warning is given to the user, or the judgement information is transmitted to the remote place by using the telecommunication circuit.

Next, a judgement method by comparing the inclination of the straight line on the image will be described. 1.

1. Previously, the image A as the reference image is taken in by the image capturing means, and stored in the memory. The image A is, for example, an image when the image processor is the new one.

2. The straight line is extracted from the image information of a target area of the image A, and approximates it to the linear expression (Y=aX+b).

3. The image B as the comparison image is taken in by the image capturing means, and stored in the memory. The image B is an image obtained at the image capturing timing.

4. The straight line corresponding to the above 2 of the image B is extracted, and approximated in the same manner to the linear expression.

5. From the liner expression of the image A and the linear expression of the image B, tan $\theta$ is calculated.

6. The judgement is conducted according to whether the angle $\theta$ calculated in the above 5 exceeds a previously determined threshold value (for example, 2°). This judgement method is preferably used for the aging change.

In this connection, the arrangement position of the image capturing means is not limited to the place shown in FIG. 5 and FIG. 6, but the position is not particularly limited when it is a position at which photographing can be conducted on a place at which the mechanical trouble easily occurs. As the mechanical trouble, other than the conveyance jam, cases in which the conveyance roller is bent, the shaft is broken, the breakage of the member occurs, or the opening and closing of the shutter become impossible, are supposed.

As described above, in the case where the image capturing means of the present invention is arranged in the image processor, when the mechanical trouble occurs, the maintenance control operation can be effectively conducted by previously collecting the image data in the apparatus, and further, even when the apparatus is not opened, or even when the service man does not go to the apparatus installation position, the content of the mechanical trouble can be accurately grasped, and the service man can cope with the trouble without any useless movement.

In the above-described FIG. 5 and FIG. 6, in order to specify the mechanical trouble, the image capturing means to capture the image data itself in the apparatus and the like are arranged, and for the same purpose, an image processor in which, instead of the image capturing means, the light source to emit the light with the wavelength outside the photosensitive area of the photosensitive medium, a locus detection means for detecting the locus of the light emission, and a processing means which compares the locus of the light emission which is a reference when the image processor is normally operated, to the locus of the light emission detected by the locus detection means, and when the locus of the light emission which is a reference, and the detected locus of the light emission are different from each other, judges that the processor is abnormal, and stores the judgement information, are arranged, is also listed as a preferable mode of the present invention.

This presupposes that, when the mechanical trouble occurs in the apparatus, the physical position of the member changes, and when the member is bent, broken, or when the foreign matter exists, because the reflection changes, when the locus of the light emitted from the light source is different from the previously stored locus of the normal condition, the abnormal movement is discriminated. It is a design matter that, when how much amount of the difference exists between the locus of the detected light and that of the normal condition, the processor is judged to be abnormal.

As the light source, the same light source described in FIG. 5 and FIG. 6 (the light source to emit the light by which the photosensitive medium is not exposed) can be used, however, the LED or laser whose spot diameter is narrowed so that the locus of the light can be easily discriminated, is preferable.

As the locus detection means, each kind of sensors such as the CCD or photodiode can be used. The locus detection means may be able to only detect the locus of the light (detection whether the light is received at a predetermined position), and it may not have the ability to capture the image data as the above-described image capturing means (it may also have the ability to capture the image data). When the light emission from the light source does not reach the light receiving position which is the previously stored reference when the apparatus is normally operated, a processing means judges the occurrence of the mechanical trouble, and can specify the accurate position of the mechanical trouble and the kind of the mechanical trouble (breakage or distortion), corresponding to the deviation of the light receiving position. The processing means is a CPU (Central Processor Unit) or the like, in the apparatus. Such the judgement information of the mechanical trouble is stored in the memory in the CPU, and is taken out when the service man requires it, or transmitted to the remote place through the telecommunication circuit which is a communication means. The transmission of this judgement information stored in the memory can be appropriately conducted by the request of the user or the service station side, at every fixed time, preset time and day, or at the time of mechanical trouble.

When the processing means judges the mechanical trouble, it is displayed on the display section of the image processor as the judgement information, and an alarm is given to the user, or it is transmitted to the remote place such as the service station through a telecommunication circuit as the transmission means, and the countermeasure is demanded to the expert.

More than one of the above light sources, locus detection means, and processing means are arranged at the appropriate positions at which the mechanical trouble in the apparatus easily occurs. Further, when only the light source or the light source and locus detection means are arranged as an appropriately movable mechanism in the apparatus, because the mechanical troubles at a plurality of portions can be judged by one set of the light source and the locus detection means, it is an preferable mode.

Further, the comparison, judgement, and storing operation of the mechanical trouble by the light source, locus detection means and the processing means can conducted by the remote control from the outside of the apparatus, or the remote place through the telecommunication circuit. Further, these operations for the mechanical trouble can be appropriately conducted at every fixed time, preset time and date, at the time of the mechanical trouble, or by the request of the user or service station side. When the comparison, judgement, and storing operation are conducted at every fixed time, because the minute change due to the elapsed time of the machine in the apparatus can be inspected, the specifying of the cause of the mechanical trouble can be easily conducted, or the replacement time of the replacement parts can be appropriately grasped, therefore, it is preferable.

In this connection, the timing and the judgement method of the detection operation of the locus of the light by the tack detection means can be considered in the same manner as the above-described capturing timing and judgement method of the image.

As described above, in the system of the embodiment 2, an image processor in which the content of the mechanical trouble in the image processor can be previously grasped, and which can quickly cope with it, can be provided.

(Embodiment 3 of the Invention)

Figure 8:
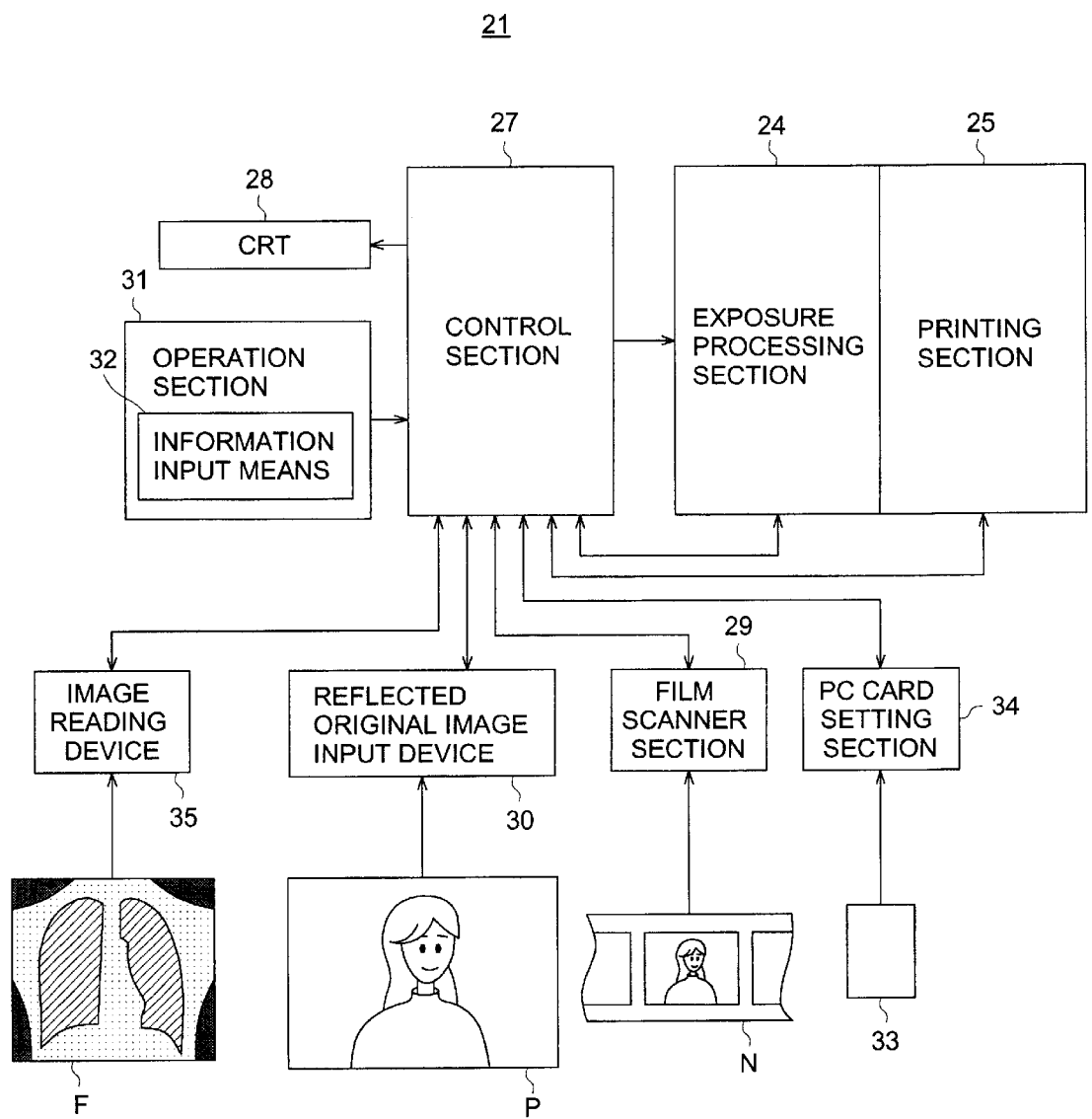
FIG. 8 is an outline structural view of the print forming apparatus of the embodiment 3.

Referring to FIG. 1, FIG. 2 and FIG. 8, the embodiment 3 of the device control system of the present invention will be described for an apparatus which records the image from the photographic negative film onto the printing paper, however, the present invention is not limited to this embodiment.

Because, in the medical image such as, for example, the CT view or radiographic image, the shade and shadow of the image delicately influences the reading diagnosis, in the apparatus for forming the image (formation into the hard copy), the density control is very important. Further, in the same manner, also in an inspection apparatus for inspecting the existence of the defect in the factory, it is the same. Further, also in a designer or a factory to output the printing matter, the chromatic control is important. According to the user, even in the case of the same printing output device, because the ink is delicately different, when the ink data of respective printing devices is not fully grasped, the remote maintenance is impossible. The explanation of FIG. 1 and FIG. 2 for the overall system is as described above. Further, in the present embodiment 3, an image processor 21 has the structure shown in FIG. 8. In this connection, the structure corresponding to the above-described FIG. 3 is denoted by the same numeric numbers. These are the same as in FIG. 3, therefore, the explanation is omitted.

In FIG. 8, an image reading apparatus 35 is further provided, and a medical image, for example, a CT view or radiographic image recorded in the recording medium F such as the film is read out.

Figure 9:
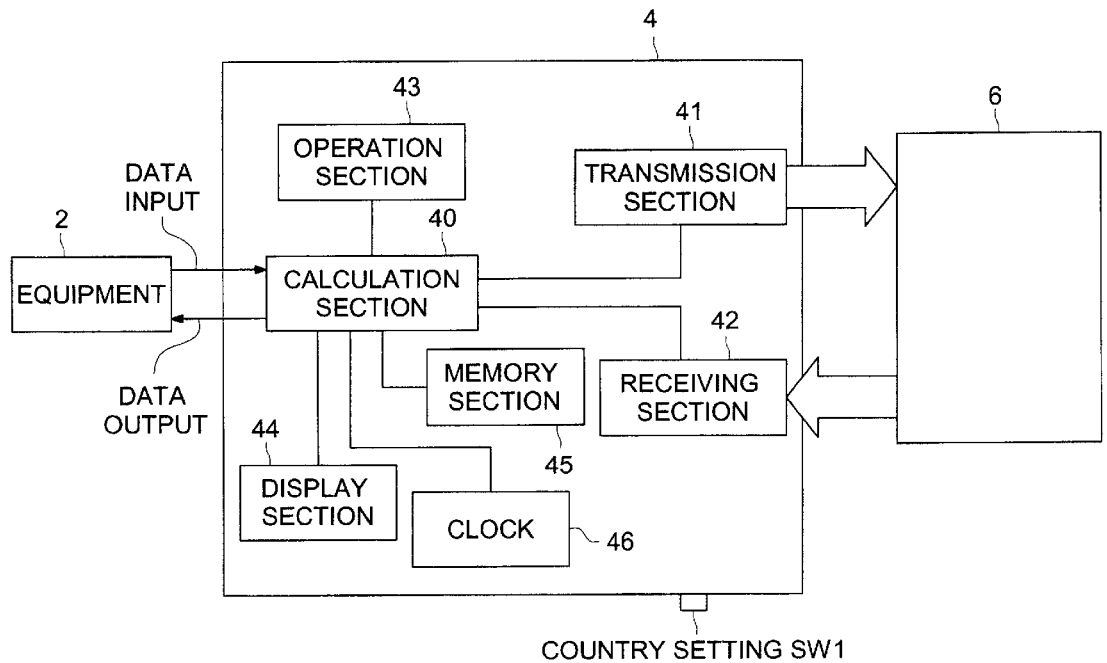
FIG. 9 is an outline structural view of a communication equipment separately provided on the device.

A communication equipment 4 in the present embodiment is shown in FIG. 9, and FIG. 9 is an outline structural view of the communication equipment separately provided to the device (the image processor 2 in FIG. 1). In this connection, the structure corresponding to FIG. 3 is denoted by the same numeric numbers.

The communication equipment 4 of the present embodiment is provided with a calculation section 40, transmission section 41, receiving section 42, operation section 43, display section 44 and storage section 45. The information of the abnormality collected from the device 2 is stored in the storage section 45, and this information is processed in the calculation section 40, and transmitted from the transmission section 41 to the control apparatus 3 through a communication path 6. Further, the information sent from the control apparatus 3 through the telecommunication circuit 6 is received by the receiving section 42, and the information is processed by the calculation section 40 and sent to the device 2. Further, in the communication equipment 4, a clock 46, and a country setting switch SW1 are provided.

Figure 10:
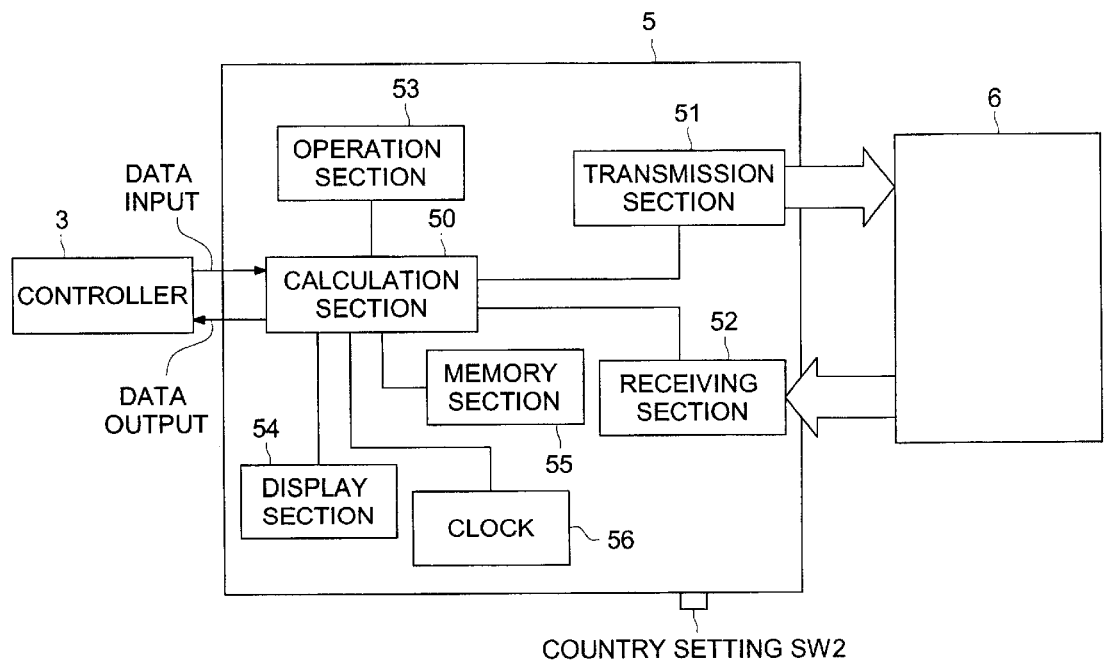
FIG. 10 is an outline structural view of the communication equipment separately provided on the device.

A communication equipment 5 of the present embodiment is shown in FIG. 10 which is an outline structural view of the communication equipment separately provided to the control apparatus (the control apparatus 3 in FIG. 1). In this connection, the structure corresponding to FIG. 3, is denoted by the same numeric numbers.

The communication equipment 5 of the present embodiment is provided with a calculation section 50, transmission section 51, receiving section 52, operation section 53, display section 54 and storage section 55. The information sent from the device 2 through the communication path 6 is received by the receiving section 52, and the information is processed by the calculation section 50 and sent to the control apparatus 3. According to this information, the control apparatus 3 processes the information such as instructions in the calculation section 50, and transmits it from the transmission section 51 to the device 2 through the communication path 6. Further, the communication equipment 5 is provided with a clock 56 and country setting switch SW2.

On the display sections 44 and 54 in FIG. 9 and FIG. 10, the message can be noticed to the operator, and in the operation sections 43 and 53, the operation can be changed by the judgement of the operator.

Further, in the communication equipment 4 and the communication equipment 5, the communication system and/or communication path 6, which conduct the transmission and reception of the information, can be switched corresponding to the conditions, and these can be switched corresponding to at least the kind of the device 2, version of the device 2, kind of the information, and amount of the information.

The communication equipments have the e-mail or ftp as the communication system, and the public line or private circuit as the communication path. As the public line, the telephone circuit, or Internet circuit exists, and as the private circuit, the private LAN exists, and these are selected corresponding to the conditions and communication is conducted. Because this communication system and/or communication path is displayed on the display sections 44 and 54, the communication condition can be visually confirmed.

An example of the transmission and reception by the communication equipment 4 and the communication equipment 5 will be detailed below.

Initially, the transmission and reception of the information by the device 2 and the control apparatus 3 will be described below.

The information can be transmitted and received by the device 2 installed in the shop, office, hospital and factory, and the control apparatus 3 which is connected to the device 2 through communication circuit, and which conducts the maintenance control of the device 2, and the transmission side stores the last time transmitted transmission data, and the receiving side stores at least one portion of the last time received data, and at the time of next transmission and reception, the transmission data can be transmitted based on a portion of the last time transmission data.

In the case where, in the difference data transmission, the data exchange or the trouble situation or processing situation reporting is conducted, when the data of the other side which is the reference of the difference, is ambiguous, the deviated data is transmitted, and reversely, a trouble occurs. When there is the just before condition information of the device 2 installed in the shop which is the transmission side in the control apparatus 3, for example, the version of the software, the just before condition of the contact content transmitted to the control apparatus 3, or the content which is transmitted last time from the control apparatus 3 side to the device 2 side, it is necessary that the portion subsequent to it is accurately transmitted, however, the transmission side stores the last time transmission data, and the receiving side stores at least a portion of the last time received data, and at the time of the next transmission and reception, when the transmission data is transmitted on the base of a portion of the last time transmission data, the transmission can be accurately conducted in a short time and at a low cost, and the control apparatus side can conduct the maintenance according to the accurate information.

Further, in the case where a portion of the last time transmission data is stored, when a specific code is attached to the portion and stored, in the difference data transmission, then, when the data exchange or the trouble situation or processing situation reporting is conducted, the trouble can be prevented from occurring.

Further, the transmission data can be transmitted being attached with the data reference value. For example, the conversion table of inch and meter unit is installed in the device 2. When the reference value of the data such as the reference unit of the length, the unit of the light amount, the unit of the time interval, which are different in the unit and widely used also among foreign countries, and in the country, is known, the adequate maintenance instruction can be given.

Further, the content of the inherent reference value of the device 2 can be stored in the control apparatus 3, and even in the case where a new maintenance instruction is given, or the data of the device 2 installed in the other shop or office, hospital, factory is transmitted, correspondence can be attained, and comparison to each other, and examination can be easily conducted.

Further, a portion of the transmission data of the last time transmission is stored in the transmission side storage section, and at the time of this storing in the transmission side storage section, a predetermined portion of the data is stored integrally with at least the transmission destination ID data, and thereby, the continuity when the data is transmitted next time, can be confirmed. Further, when the data is stored integrally with at least the transmission side ID data, and is transmitted to the same transmission destination next time, the continuity in this case can be confirmed.

Figure 11:
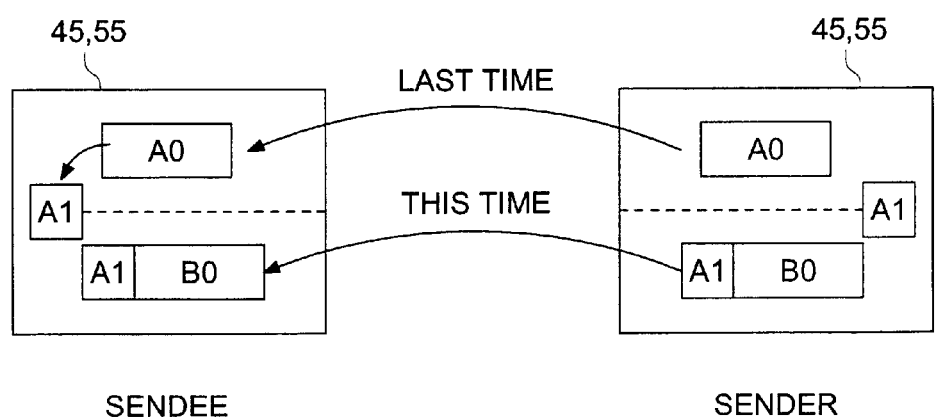
FIG. 11 is a view for explaining the transmission and reception of the transmission data.

Further, as shown in FIG. 11, one portion A1 of the last time transmission data A0 is stored and left in the transmission side storage sections 45 and 55, and when the last time transmission data portion in the this time received data B0 is not coincident with the data A1 in which a portion of the last time received data A0 is stored, it is judged to be abnormal, and the effect can be reported, and thereby, the transmission of the different data can be prevented.

Further, when the last time transmission data portion in the this time received data B0 does not coincide with the data A1 in which a portion of the last time received data is stored, a mode to notice to the transmission side so that all of the already transmitted data are transmitted, can be selected, thereby, all of the data are transmitted, and the different data is prevented from being transmitted.

Further, when the transmission data in the this time received data B0 does not coincide with the data portion which is received last time and stored, the average value of the data is changed so that both of data are extremely coincident with each other, or are coincident in a predetermined range, or only a final data portion is changed so that it coincides with that data portion, or in the case of a plurality of data, these data are changed so that the majority coincides with that data portion, and these respective changed values are stored together with the ID data of the transmission side, thereby, it can be prevented that, in the difference data transmission, in the case where the data exchange, or trouble condition or processing condition reporting is conducted, when the other side data as the reference of the difference is ambiguous, the deviated data is transmitted, and reversely, the trouble occurs.

As another example, the version data of the using software is the just before possession data of the device 2 installed in the shop, and the just before data of the data grasped on the control apparatus 3 side, and is transmitted together with the time data including the version of the reference data and date, thereby, the trouble is avoided.

Further, because the storage means also has the limited capacity, the old data is compressed or thinned out and the amount of data is reduced. For the abnormal image, there is an inquiry from the other sections or for the necessity of utilization from this time forth, the image may be particularly saved for a long period of time. For the normal data, its compression rate may be increased for example, after the passage of a predetermined period or at the stage in which it enters within, for example, 20% of the old data of the memory capacity of the storage means.

The communication cost of the data from the device 2 installed in the shop to the control apparatus 3 can be decreased when the difference data is sent. The communication cost of the data from the control apparatus 3 to the device 2 can be decreased when the difference data is sent, however, the interference prevention and the countermeasure for wire tapping by a third person are necessary.

For example, the control apparatus 3 has the history for the control software to store and save the software version of each device 2 which is taken charge by the apparatus 3, control software of each unit, and the other application software.

For example, there is a case where the software version is Ver. 1, 01 when purchased, and a portion is changed after one year, and the software version Ver. 1, 01b for only the device 2 installed in the shop (Example: the conveyance timing of the exposure processing section 24 and the printing section 25 is changed), is changed to Ver. 2, 5 after 3 years, or the like.

All of versions of past time in which the corresponding software (color conversion table, or the like) of the flat bed scanner of the reflection document input apparatus 30 is not changed, are saved. Further, all of the history is saved. Alternatively, for each unit, the history of each version is stored for each of software.

In the version having the software which determines the sequence of the apparatus, for example, in the case where it is adapted to only the Tokai district, when the chain stores are on a nationwide scale, and from the chain head office, the direction that the specification of AAA is changed to BBB, is given and the Tokai district also uses the same change, in the case where the Tokai version has no specification of AAA but has CCC, it is a cause of trouble.

Further, in the North Japanese Area in the winter season, in the case where the apparatus is started first in the morning, when 1.5 times of the idling time is necessary than that of the West Japanese Area (as the countermeasure for dew condensation), in the case where the difference of the version, or further, the change of the characteristic of the exposure system or the recording material is not fully controlled, the trouble occurs.

Further, when the vibration of the apparatus is monitored, the vibration monitor information is always obtained, and at the time of this time transmission, when the data of the nearest time point of the last time transmission data is transmitted with together, on the receiving side, it is checked whether this data coincides with the latest value of the last time vibration data of the same apparatus (ID is confirmed) received previously, and when it does not coincide with, (1) it is required that the retrial and retransmission are conducted, (2) the non-coincidence is reported, (3) it is operated so that the data coincides with that in a certain range, and the estimation is conducted according to that.

Further, in the case where the sensor is abnormal, when it is recognized that the vibration is changed although the vibration is the same in itself, this becomes mistake. When the sensor abnormality occurs, or actually, for example, the vibration of the conveyance system of the recording medium is due to the fault or abnormality of gear or belt, it is considered that there is almost no possibility that the coincidence is attained at the time of the end of a predetermined range of the data of the transmission.

As described above, when the transmission data itself is the data having the time axis, it is stored including the just before data of the last time transmission or received data, and the stored this just before transmission data is added to it and the this time transmission data or stored just before received data is compared to it, and by recognizing the this time received data, the occurrence of the trouble like as the deviated data is transmitted in the difference data transmission, can be prevented. To recognize the received data, means to estimate the received data and estimate it including the usability, retransmission request, non-coincidence information, and the data processing after that becomes easy.

Further, when a portion corresponding to the last time transmission data in the this time received data is not coincident to the data in which a portion of the last time received data is stored, the received data is moved in parallel so that the data in the latest time axis coincide with each other, and simply made to coincide with each other, thereby, the occurrence of the trouble like as the deviated data is transmitted in the difference data transmission, can be prevented.

As a method to erase the memory of the data such as the density history of the device 2, the storage capacity in the control apparatus 3 is secured a predetermined time longer than the memory portion of the device 2 installed, for example, in the shop. The circular graph for the residual amount presumption according to the storage capacity and an increase of the memory amount, and the report, is installed, and the reporting is conducted at a predetermined residual amount.

Further, for the special history or sales information, for example, for the measure for the report to the tax office, the storage medium is provided so that these data is saved for more than one year. The content of contract such as written guarantee, or indemnity regulation, is saved, for example, so that it can not be erased, and ready for the conflict in a future lawsuit, or the similar case.

As a measure to maintain the continuity of the data or the maintenance instruction, particularly, the data (density, temperature, light amount) is transmitted so that it is overlapped with a portion of the final data, and when the change is made including the scale (time interval, distance interval, the standard units of the data) of the transmission data, because a large mistake occurs when only the numeric value is believed, these are transmitted together with the data.

Both of the data and image are integrally conducted with the electronic papermark as the image data, thereby, the security is increased and the existence of the falsification can be checked. The electronic papermark is written in, for example, Japanese Tokkaihei No. 10-164549 and Japanese Tokkaihei No. 10-191025.

The electronic papermark is a technology in which, by intentionally changing the value of a portion or the whole of the data, the other information is embedded in the original data, and because the history data is integrally mixed in the electronic papermark and saved, the falsified data can be easily judged by the electronic papermark.

Figure 12:
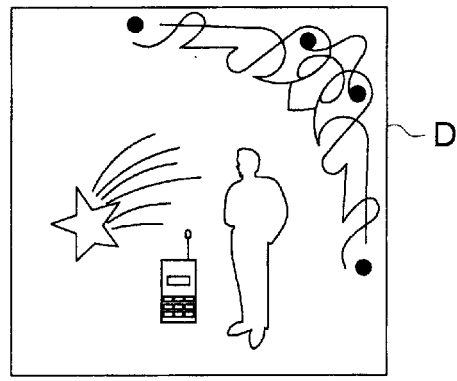
FIGS. 12(a) to 12(c) are views showing an embodiment of the electronic papermark.
Figure 12:
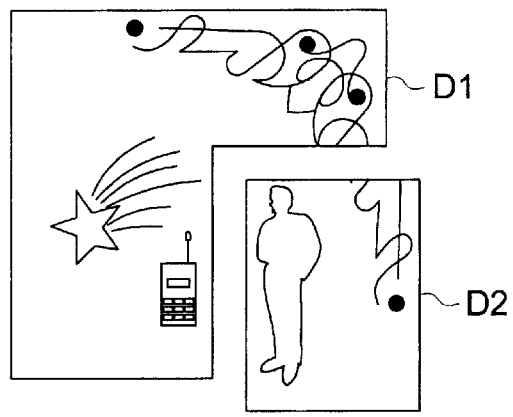
Figure 12:
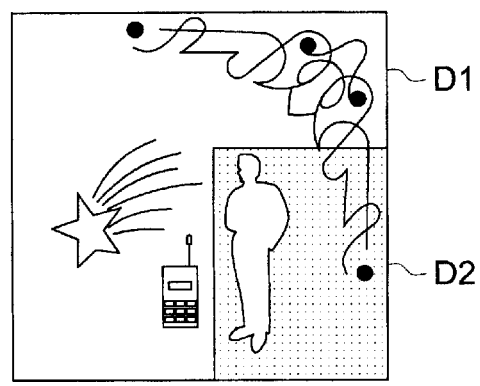

The electronic papermark is, for example, as shown in FIGS. 12(a) to 12(c), the data is divided into an area D1 in which the image data generates the hash value and an area D2 in which the generated hash value is hidden, and the hash value is calculated from the information of the area D1, and by encoding it by the secret key, it is hidden into the area D2, and this hiding of the electronic papermark is conducted by operating the pixel value in the actual space or frequency space in such a degree in which the hiding can not be visually recognized, and it can be possible that the image is divided, and the authorization information to be hidden in one side image can be obtained from the other side image itself.

Further, for the calculation of the residual amount of the supplies or the exchange necessary time, in the case of the difference data, the last time data and the time information at the time point of the output (time point contacted to the control apparatus 3) of the data are combined and recorded, and the error by the accumulation is prevented.

Next, in the present embodiment, when the transmission data and the completion time point data of the last time transmission data do not coincide with each other, it is judged to be abnormal, and that effect is reported.

For example, the data of the processing solution density, the light output value at the predetermined voltage of the light source section, and residual amount of the photosensitive material, of the device 2 is accumulated together with the time point data at which the data is transmitted last time and the data value at that time, thereby, the history data of each device 2 is controlled. The data newly transmitted one week later is transmitted together with the used amount of the photosensitive material during this one week, the processing solution density measured today, light output of the light source section measured today, and the time data of today, and the value of the last time transmission data, however, when the this time transmission data is the data which is to be originally older than the last time numeric value, or separated from the last time numeric value, it is judged to be abnormal, and that effect is reported. As described above, when the transmission data does not coincide with the completion time point data of the last time transmission data, the device is judged to be abnormal, and that effect is reported and the different data is prevented from being transmitted.

Further, in the case where, in the density data, ver. 1.2 is transmitted together with the this time data ver. 1.15, when it is different from the data of ver. 1.3 which is sent to the control apparatus 3 one week before, there is a possibility that the ID of the device 2 of the transmission side is erroneously transmitted last time or this time, or the software of the history data control is mistaken by the noise, and is different, however, in the case where these are not coincident, when the difference data is adopted as it is, because it is risky, although it takes a long period of time, the mode to transmit all of the data is selected.

As described above, in the case where the transmission data and the completion time point data of the last time transmission data are not coincident with each other, the mode to transmit all of the data is selected, and all of the data are transmitted, thereby, the different data can be prevented from being transmitted.

Figure 13:
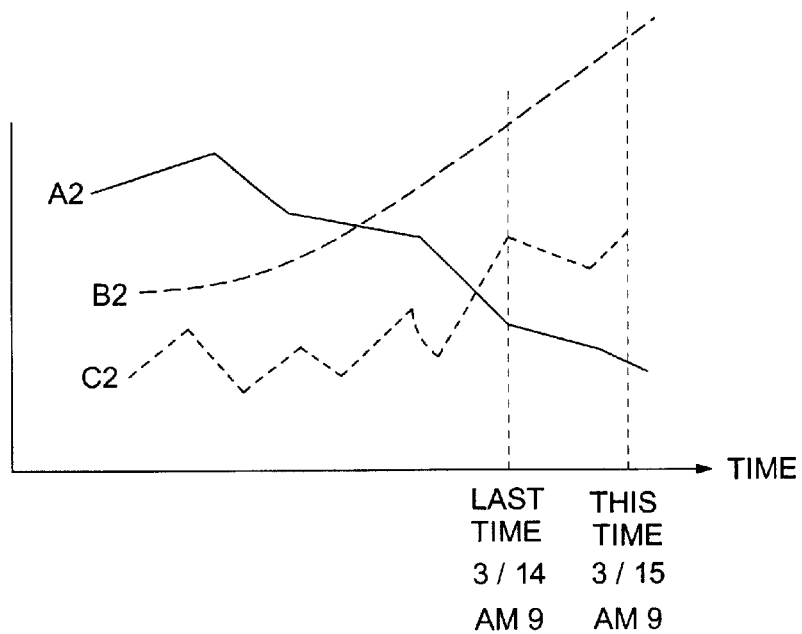
FIG. 13 is a view for explaining the transmission and reception of the data having the time series.

FIG. 13 is the data A2, B2 and C2 having the time series, and in this time (March. 15), when the data for the latest 10 minutes of the data for one day of two times before (March. 13) transmitted at the last time (March. 14) is integrally transmitted with the one time data of the last time (March. 14), it is checked that it is the data from the same apparatus, and is found whether there exists the abnormality in the sensor system.

Figure 14:
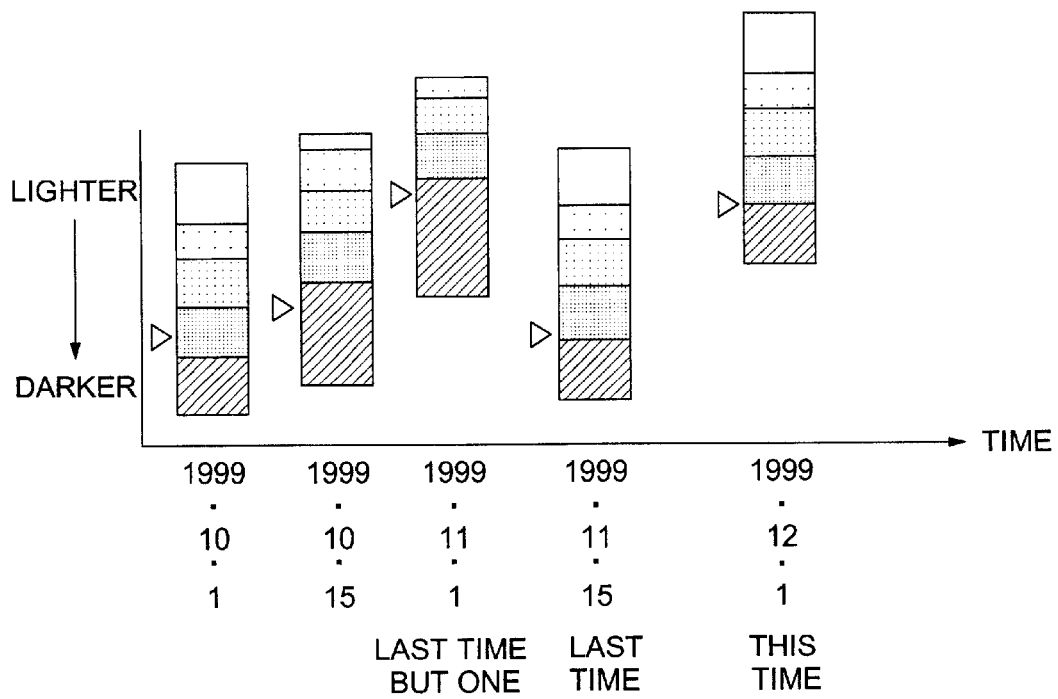
FIG. 14 is a view for explaining the transmission and reception of the histogram of the recording density obtained by recording the reference patch (density) in a total copy list in a day.

FIG. 14 is not the time series data, and for example, in the total copy table during one day, it is a view showing the change of the data for each half month, in which it is shown that the more thick the lower portion black of the histogram of the recording density obtained by recording the reference patch is, the thick data of the density is more, for example, when, at the two times before (November 1), it is whitish up to the lower portion, for example, at the last time (November 15), the density is low.

The this time data which is transmitted at December 1, 1999, is not the whole data up to the last time, and the data is transmitted together with the data transmitted last time (November 15). On the receiving side, there is already no data of October 1, October 15, and November 1, and only the data of the last time (November 15) is saved, and the last time (November 15) data transmitted together this time (December 1) is compared to the save data, and the coincidence is confirmed. When these are not coincident according to circumstances, it is operated so that the average value, that is, the triangle mark on the left side in FIG. 13 is coincident. Alternatively, on the receiving side or transmission side, only a portion of the past time data, for example, the average value (triangle mark) may also be stored for many years.

Further, the information can be transmitted and received between the device 2 installed in the shop and the control apparatus 3 to conduct the maintenance control of the device 2, and when transmitted, the time stamp can be electronic-stamped on the transmission data. Particularly, in the present example, it is specified that the time stamp is by the display of the time zone of the transmission side, the display of the time zone of the receiving side, or further, the display of the international standard time.

In the transmission data, for example, there is the present state data of the device 2, sales data, past time history data, advices or instructions from the control apparatus 3, software data of the update, LUT data, or the data to assist the determination of the responsibility or the apparatus such as the name of the person under charge or the name of the apparatus to transmit these data, and when these data is transmitted, the time stamp is electronic-stamped on them.

The electronic stamp includes also a case in which it is mixed in the transmission data, or the case in which it is inserted sparsely by making the transmission data as an image, or a case in which it is mixed in the text data like as the cipher.

As described above, in the case where the data is transmitted, when the time stamp is electronic-stamped on the transmission data, for example, the time zone of the transmission side can be specified, therefore, there is no confusion relating to which data is former one and which data is latter one. Further, it can be specified that, for the trouble of which condition, the maintenance advice is sent to the apparatus, thereby, the false advice can be prevented.

Further, on the transmission data, the country name, the time zone and the time stamp can be electronic-stamped together by using the country setting switches SW1 and SW2, or clocks 46 and 56. When on the transmission data, the country name, the time zone and the time stamp are electronic-stamped together, although, in USA, the time is further confused according to a system called the summer time (daylight saving), in order to avoid such the confusion, by specifying which time display is used, there is no confusion relating to which data is former one and which data is latter one.

When the data is received, by electronic-stamping the time stamp on the received data, for example, the time zone of the receiving side can be displayed, thereby, there is no confusion relating to which data is former one and which data is latter one. Further, the time stamp can be stamped including the location data and the ID of the control apparatus, thereby, the data in which condition, and the measurement result by using which device can be recognized. For example, when the device is moved from Hokkaido in Japan in which it is originally installed, to Kyushu in Japan, the data in which condition, and the measurement result by using which device can be recognized. As the location data, the GPS is mounted in the apparatus, and the correct position is known, thereby, the installation place mistake by the misunderstanding can be prevented.

As described above, in the system of the embodiment 3, the transmission side saves at least one portion of the transmission data transmitted last time, and the receiving side saves at least a portion of the received data received last time, and at the time of the next time transmission and reception, when the transmission is conducted on the base of one portion of the last time transmission data, the transmission data can be accurately transmitted in a short time at the low cost, and on the control apparatus side, the maintenance operation can be conducted on the base of the accurate information.

Further, when one portion of the last time transmission data is saved, a specific code is attached to that portion, thereby, the occurrence of the trouble when the data exchange, or the trouble condition or processing condition report is conducted in the difference data transmission, can be prevented.

Further, when the data reference value is attached and the data is transmitted, and although the units used between foreign countries, or in the domestic country, are different, when the reference values of the data such as the reference unit of the length, unit of the light amount, unit of the time interval, are known, the adequate maintenance instruction can be conducted.

Further, even when the new maintenance instruction, or the data of the device installed in the other shop, or office, hospital, factory, is transmitted, the correspondence can be made, and these data are compared and easily investigated.

Further, when a portion of the transmission data transmitted last time is saved in the transmission side storage section, by integrally saving a predetermined portion of the data with at least the transmission destination ID data, the continuity when the data is transmitted next time, can be confirmed.

Further, on the receiving side on which the transmission data is received last time, when a portion of the received data is saved in the receiving side storage section, by integrally saving the data with at least transmission side ID data, the data is transmitted next time to the same transmission destination, and the continuity in that case can be confirmed.

Further, when the last time transmission data portion in the this time received data does not coincide with the data in which a portion of the last time received data is stored, it is judged to be abnormal, and the effect is reported, thereby, the different data can be prevented from being transmitted.

Further, when the data is not coincident, a mode to report that the whole of the already transmitted data is transmitted, to the transmission side, is selected, and the whole data is transmitted, thereby, the different data can be prevented from being transmitted.

Further, the system in the present embodiment can prevent that, in the case where the data exchange or the trouble condition or processing condition report is conducted in the difference data transmission, when the other side data as the reference of the difference is ambiguous, the deviated data is transmitted, and reversely, the trouble occurs.

Further, when the time stamp is electronic-stamped on the transmission data, for example, the time zone of the transmission side can be specified, therefore, there is no confusion relating to which data is former one and which data is latter one, and further, it can be specified that, for the trouble of which condition, the maintenance advice is sent to the apparatus, thereby, the false advice can be prevented.

Further, when, on the transmission data, the country name, the time zone and the time stamp are electronic-stamped together, although, in USA, the time is further confused according to a system called the summer time (daylight saving), in order to avoid such the confusion, by specifying which time display is used, there is no confusion relating to which data is former one and which data is latter one.

Further, in the case where the data is received, when the time stamp is electronic-stamped on the receiving data, for example, the time zone on the receiving side can be displayed, thereby, there is no confusion relating to which data is former one and which data is latter one.

Further, by electronic-stamping the time stamp including the location data and the ID of the control apparatus, for example, when the device is moved from Hokkaido in which it is originally installed, to Kyushu, the data in which condition, and the measurement result by using which device can be recognized.

Further, when this time received data is recognized by comparing it with this time transmission data or the stored just before received data, the occurrence of the trouble like as the deviated data is transmitted in the difference data transmission can be prevented.

Further, when the data is not coincident, by moving in parallel the received data so that the data in the latest time axis coincides with that, and simply coinciding it, the occurrence of the trouble like as the deviated data is transmitted in the difference data transmission can be prevented.

Further, when the received data is estimated including the usability, retransmission request, and the non-coincidence information, the data processing hereinafter becomes easy.

What is claimed is:

1. A maintenance control system of an image processor for processing an image, comprising:
   (a) the image processor;
   (b) a communication section for transmitting and receiving information between the image processor and a control apparatus for controlling maintenance of the image processor; and
   (c) an information obtaining means for obtaining information to reproduce a condition of the image processor on a control apparatus side,
   wherein the information obtained by the information obtaining means is transmitted to the control apparatus together with the time information.

2. The maintenance control system of claim 1, wherein the information is one to reproduce a motion condition of the image processor, or an operation condition to the image processor on the control apparatus side.

3. The maintenance control system of claim 1, wherein the predetermined information is transmitted in parallel with a maintenance instruction of the control apparatus side.

4. The maintenance control system of claim 1, wherein the information obtaining means is a photographing means for photographing the operation condition and/or the motion condition of the image processor, and the image information photographed by the photographing means is transmitted to the control apparatus.

5. The maintenance control system of claim 4, wherein the photographing means is movable.

6. The maintenance control system of claim 4, wherein an image photographed by the photographing means is animation.

7. The maintenance control system of claim 4, wherein a time coordinate axis having a same reference as that of a motion of the image processor is displayed on an image photographed by the photographing means.

8. The maintenance control system of claim 4, wherein the image processor has a cathode ray tube (CRT), the image information includes an image displayed on the cathode ray tube.

9. The maintenance control system of claim 1, wherein the information obtaining means is a sound recording means for recording a motion sound of the image processor, and the information of the motion sound recorded by the sound recording means is transmitted to the control apparatus.

10. The maintenance control system of claim 9, wherein the motion sound is recorded along with generation time timing data.

11. The maintenance control system of claim 9, wherein the sound recording means has microphones which are disposed in each section of the image processor.

12. The maintenance control system of claim 9, wherein the sound recording means records corresponding to a time coordinate axis having a same reference as that of a motion of the image processor.

13. The maintenance control system of claim 1, wherein the information obtaining means is a smell detection means for detecting a smell at a predetermined position of the image processor, and smell information detected by the smell detection means is transmitted to the control apparatus.

14. The maintenance control system of claim 1, wherein the information obtaining means is a vibration detection means for detecting a vibration at a predetermined position of the image processor, and vibration information detected by the vibration detection means is transmitted to the control apparatus.

15. The maintenance control system of claim 14, wherein the vibration information is transmitted to the control apparatus along with a time coordinate axis having a same reference as that of a motion of the image processor.

16. The maintenance control system of claim 1, further comprising a physical characteristic value change detection means for detecting a change of a physical characteristic value of any one of the heat, light, and pressure, and change information of the physical characteristic value detected by the physical characteristic value change detection means is transmitted to the control apparatus together with time information.

17. The maintenance control system of claim 16, wherein a standard time to be used is stored in the image processor along with the change information and the time information.

18. The maintenance control system of claim 16, wherein input information of the change information of the physical characteristic value is stored in the control apparatus along with the change information and the time information.

19. The maintenance control system of claim 16, wherein at least one of a transmitting content, a date and hour to be transmitted, a transmitter and a receiver is stored in the image processor as information corresponding to information transmitted from the control apparatus.

20. The maintenance control system of claim 1, further comprising a memory means for storing the information obtained by the information obtaining means, wherein when abnormality of the image processor occurs, an output of the information obtaining means is integrally recorded in the memory means with an abnormality occurrence content, abnormality occurrence time and time before and after the abnormality occurrence time.

21. The maintenance control system of claim 1, wherein data in a normal condition of the image processor is stored, and data in a condition of a series of motions is obtained for each prescribed period of time, and the data is compared with the data in the normal condition, and then abnormality is detected according to a comparison result exceeding a predetermined difference.

22. The maintenance control system of claim 1, wherein when the control apparatus receives abnormal information, the control apparatus stores also receiving time information of the abnormal information.

23. The maintenance control system of claim 1, wherein the image processor stores at least one of a transmission content, a transmission date and hour, a transmitter and a receiver transmitted from the control apparatus corresponding to the abnormal information.

24. The maintenance control system of claim 1, wherein the image processor is an image processor to process a photosensitive medium, and has an image capturing means for capturing the image in the image processor as the image obtaining means in the image processor.

25. The maintenance control system of claim 24, wherein the image capturing means comprises a light source for emitting light having a wavelength outside a photosensitive area of the photosensitive medium, and either a CCD camera or CMOS camera capable of detecting the light emitted from the light source.

26. The maintenance control system of claim 24, wherein image data captured by the capturing means is transmitted through the communication section.

27. The maintenance control system of claim 24, wherein an image capturing motion by the image capturing means is capable of remote controlling.

28. The maintenance control system of claim 24, wherein an image capturing motion by the image capturing means is automatically conducted at fixed periods of time.

29. The maintenance control system of claim 24, wherein the image processor is a medical equipment.

30. The maintenance control system of claim 1, wherein the image processor is an image processor for processing a photosensitive medium, and further has a light source to emit light having a wavelength outside a photosensitive area of the photosensitive medium, a locus detection means for detecting a locus of the light emission, and a processing means for comparing the locus of the light emission which is a reference when the image processor is normally operated, with the locus of the light emission detected by the locus detection means, and for judging as abnormal when the locus of the light emission as the reference and the locus of the detected light emission are different from each other, and for storing the judgment information, in the image processor.

31. The maintenance control system of claim 30, wherein the judgment information is transmitted through the communication section.

32. The maintenance control system of claim 31, wherein the judgment information is transmitted at a predetermined date and hour.

33. The maintenance control system of claim 30, wherein a comparison motion, a judgment motion and a storing motion by the processing means is capable of remote controlling.

34. The maintenance control system of claim 30, wherein a comparison motion, a judgment motion and a storing motion by the processing means is automatically conducted at a preset date and hour.

35. The maintenance control system of claim 34, wherein the image processor is a medical equipment.

36. The maintenance control system of claim 1, wherein a transmission side stores transmission data transmitted at a last time, and a receiving side stores at least a part of the received data received at the last time, and at a next transmission and reception time, a transmission is conducted based on a part of the last time transmission data.

37. The maintenance control system of claim 36, wherein when the transmission side stores a part of the transmission data transmitted at the last time, the transmission side stores with a specified code attached to the part.

38. The maintenance control system of claim 36, wherein when the transmission side stores, in a memory section of the transmission side, a part of the transmission data transmitted at the last time, the transmission side integrally stores a predetermined part of the data with ID data of a receiver.

39. The maintenance control system of claim 36, wherein the receiver side received the transmitting data at the last time, integrally stores a part of the received data at the last time with ID data of the transmitter when the receiver side stores in a memory section of the receiver side.

40. The maintenance control system of claim 36, wherein when data transmitted at the last time among data received at this time does not coincide with data in which a part of the data received at the last time is stored, a judgment is made as abnormality and the abnormality is informed.

41. The maintenance control system of claim 36, wherein when data transmitted at the last time among data received at this time does not coincide with data in which a part of the data received at the last time is stored, a mode to inform to the transmitter so that all of the data received at the last time are transmitted, is selected.

42. The maintenance control system of claim 36, wherein when data transmitted at the last time among data received at this time does not coincide with a part of the data received and stored at the last time, the data is changed so that both of the data coincide most or within a predetermined range with each other, and the changed data is stored with ID data of the transmitter.

43. The maintenance control system of claim 42, wherein the change of the data includes at least one of a change of mean value of the data, a change in which final data portion only of the data coincides, and a change in which most of a plurality of data coincide with each other.

44. The maintenance control system of claim 1, wherein transmission data is transmitted being attached with a data reference value.

45. The maintenance control system of claim 44, wherein content of peculiar reference value of an equipment is stored in the control apparatus.

46. The maintenance control system of claim 1, wherein when a transmission is conducted, the transmission side electronically stamps a time stamp on transmission data.

47. The maintenance control system of claim 46, wherein the transmitting side electronically stamps a country name, a time zone and a time stamp on the transmission data.

48. The maintenance control system of claim 1, wherein when the data is received, a receiving side electronically stamps a time stamp on receiving data.

49. The maintenance control system of claim 48, wherein the time stamp includes a place where the control apparatus is located, and ID data of the control apparatus.

50. The maintenance control system of claim 1, wherein when transmission data itself is data having time axis, this time receiving data is recognized when the data is stored including the data just before the last time transmission or receiving data, and this time transmission data or the stored just before receiving data is compared with the stored data.

51. The maintenance control system of claim 50, wherein when data transmitted at the last time among data received at this time does not coincide with data in which a part of the data received at the last time is stored, both of the data coincide with each other by moving the received data in parallel so that the data on the time axis coincide with each other.

52. The maintenance control system of claim 50, wherein the data received is recognized by evaluating the received data including information of possibility of utilization, a requirement of retransmittance, and inconsistency information.

53. The maintenance control system of claim 1, wherein the information obtaining means is disposed in the image processor.

54. The maintenance control system of claim 1, wherein the predetermined information obtained by the information obtaining means is transmitted by the communication section to the control apparatus through the Internet line.

* * * * *